United States Patent
Guo et al.

(10) Patent No.: US 11,275,530 B2
(45) Date of Patent: Mar. 15, 2022

(54) METHOD, SYSTEM, AND RELATED DEVICE FOR NAS DATA ACCESS

(71) Applicant: HUAWEI TECHNOLOGIES CO., LTD., Guangdong (CN)

(72) Inventors: Haitao Guo, Hangzhou (CN); Hongguang Liu, Hangzhou (CN); Junwei Fang, Hangzhou (CN); Ronghui He, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 229 days.

(21) Appl. No.: 16/020,754

(22) Filed: Jun. 27, 2018

(65) Prior Publication Data

US 2018/0314433 A1 Nov. 1, 2018

Related U.S. Application Data

(63) Continuation of application No. PCT/CN2016/108238, filed on Dec. 1, 2016.

(30) Foreign Application Priority Data

Dec. 30, 2015 (CN) .......................... 201511026076.2

(51) Int. Cl.
*G06F 3/06* (2006.01)
*H04L 67/565* (2022.01)
*H04L 67/1097* (2022.01)

(52) U.S. Cl.
CPC ............ *G06F 3/067* (2013.01); *G06F 3/0629* (2013.01); *G06F 3/0643* (2013.01);
(Continued)

(58) Field of Classification Search
CPC ...................................................... G06F 3/067
(Continued)

(56) References Cited

U.S. PATENT DOCUMENTS 7,155,458 B1 * 12/2006 Kimmel .................. G06F 16/10
7,272,654 B1 * 9/2007 Brendel .................. G06F 16/13
                                                                       709/229
(Continued)

FOREIGN PATENT DOCUMENTS

CN     1473300 A    2/2004
CN     2842562 Y   11/2006
(Continued)

OTHER PUBLICATIONS

S. Shepler et al: "Network File System (NFS) version 4 Protocol", rfc3530. Network Working Group, Category: Standards Track, Apr. 2003, 275 pages.

*Primary Examiner* — Syling Yen
(74) *Attorney, Agent, or Firm* — Womble Bond Dickinson (US) LLP

(57) ABSTRACT

This application describes a method, a system, and a related device for network attached storage (NAS) data access. The method includes receiving, by a NAS client, an access request message, and determining an operation object according to information about to-be-accessed target data in the access request message, where the operation object includes a directory and/or a file to which the target data belongs. The method may also include generating a first direct memory access file system (DMAFS) packet according to a format described by using a preset file system type, where the preset file system type is used to describe a format of a DMAFS packet. Furthermore, the method may include sending the first DMAFS packet to an acceleration apparatus, so that the acceleration apparatus converts the operation object and an operation type that are in the first DMAFS packet into NFS data, and encapsulates the NFS data into a network protocol packet and sends the network protocol packet to a NAS server.

16 Claims, 12 Drawing Sheets

(52) U.S. Cl.
CPC .......... *G06F 3/0659* (2013.01); *G06F 3/0662*
(2013.01); *H04L 67/1097* (2013.01); ***H04L
67/2823*** (2013.01); *G06F 3/0673* (2013.01)

(58) Field of Classification Search
USPC ........................................................ 707/822
See application file for complete search history.

(56) References Cited

U.S. PATENT DOCUMENTS

| | | | |
|---|---|---|---|
| 7,330,862 B1 * | 2/2008 | Srinivasan | G06F 12/0866 |
| 7,565,413 B1 * | 7/2009 | O'Toole, Jr. | H04L 67/06 |
| | | | 709/219 |
| 9,036,283 B1 * | 5/2015 | Tsai | G11C 17/00 |
| | | | 360/31 |
| 9,088,592 B1 * | 7/2015 | Craft | H04L 67/1097 |
| 10,642,505 B1 * | 5/2020 | Kuzmin | G06F 12/0246 |
| 2004/0210584 A1 | 10/2004 | Nir et al. | |
| 2010/0319044 A1 | 12/2010 | Agans et al. | |
| 2011/0131258 A1 | 6/2011 | Cesario et al. | |
| 2011/0280243 A1 | 11/2011 | Boucher et al. | |
| 2017/0214774 A1 | 7/2017 | Chen et al. | |

FOREIGN PATENT DOCUMENTS

| | | |
|---|---|---|
| CN | 101237400 A | 8/2008 |
| CN | 102171670 A | 8/2011 |
| CN | 103345482 A | 10/2013 |
| CN | 105052081 A | 11/2015 |
| EP | 1330725 B1 | 3/2012 |
| WO | 2007100521 A2 | 9/2007 |

\* cited by examiner

METHOD, SYSTEM, AND RELATED DEVICE FOR NAS DATA ACCESS

CROSS-REFERENCE TO RELATED APPLICATIONS

This application is a continuation of International Application No. PCT/CN2016/108238 filed on Dec. 1, 2016, which claims priority to Chinese Patent Application No. 201511026076.2, filed on Dec. 30, 2015. The disclosures of the aforementioned applications are hereby incorporated by reference in their entireties.

TECHNICAL FIELD

The present application relates to the storage field, and in particular, to a method, a system, an acceleration apparatus, and a NAS client for NAS data access.

BACKGROUND

Network attached storage (NAS) is a storage network sharing system that runs in a client/server (C/S) mode and that integrates distributed and independent data into a large data center managed in a centralized manner. A NAS server provides a network-based file sharing service for a NAS client without an intervention of an application server (AS). A technology that allows a user to access data on a network and that may provide a cross-platform file sharing function so as to access different hosts and application servers is increasingly widely applied to an enterprise data center.

In the prior art, as shown in FIG. 1A, the NAS client and the NAS server are connected by using a network adapter interface, and communicate based on a common internet file system (CIFS) or a network file system (NFS). The CIFS is application logic defined by Microsoft, and is mainly applied between a NAS client and a NAS server of a Windows operating system. The NFS is application logic defined by Linux and UNIX, and is mainly applied between a NAS client and a NAS server of a Linux operating system. As shown in FIG. 1B, a NAS protocol stack includes: when application software of the NAS client needs to access NAS data of the NAS server, an access request message is first sent to a virtual file system (VFS) inside the NAS client, the VFS then forwards the request message to an NFS, and the NFS converts the request message by means of external data representation (XDR), and sends the request message to a remote procedure call (RPC) module. The RPC module selects a network protocol such as TCP/IP, UDP/IP, or RDMA (the latter two protocols are not described in the figure). For example, when the RPC selects the TCP/IP protocol, network protocol processing such as open network computing (ONC) RPC and Transmission Control Protocol (TCP) RPC needs to be performed, and the request message is sent to the NAS server by using an underlying hardware device (for example, a network adapter) and a driver (for example, a network adapter driver). The NAS server receives the request message of the NAS client by using a procedure that is similar but reverse to the foregoing procedure, and returns corresponding information to the NAS client. In a scenario such as the media assets industry in which hardware resources of the NAS client are limited, due to the foregoing complex protocol processing process, the NAS client has heavy CPU load, high memory usage, and a non-ideal delay, and consequently, overall performance and data access efficiency of the NAS client are affected.

SUMMARY

The present application provides a method, a system, and a related device for NAS data access, so as to resolve a prior-art problem that a NAS client has heavy CPU load, high memory usage, and a long processing delay in a NAS data access process, thereby improving overall performance and data access efficiency of the NAS client.

According to a first aspect, a NAS data access method is provided. The method is applied to a NAS data access system. The system includes a NAS client and an acceleration apparatus. The acceleration apparatus includes a first interface and a second interface, and the acceleration apparatus is connected to the NAS client by using the first interface and is connected to a NAS server by using the second interface. First, the NAS client receives an access request message, and determines an operation object according to information that is about to-be-accessed target data and that is carried in the access request message, that is, determines a directory and/or a file to which the to-be-accessed target data belongs. Then, the NAS client generates a first direct memory access file system DMAFS packet according to a preset file system type, and sends the first DMAFS packet to the acceleration apparatus. The acceleration apparatus completes another protocol processing process of a NAS protocol stack. The preset file system type is used to describe a format of a DMAFS packet, and the first DMAFS packet includes the operation object and an operation type that is carried in the access request message. For example, the DMAFS packet includes a request number and DMAFS data. The DMAFS data includes the operation object, a parameter of a user request, an execution status of the user request, and data, so that the acceleration apparatus can convert the operation object and the operation type that are in the first DMAFS packet into network file system NFS data, and encapsulate the NFS data into a network protocol packet and send the network protocol packet to the NAS server. In this way, a protocol processing process of the NAS client is unloaded, so that CPU and memory load of the NAS client, and a processing delay of an access request are reduced, and processing efficiency of the overall NAS data access system is improved.

In a possible embodiment, the first interface is a peripheral component interconnect express PCIe interface or a high-speed peripheral interface, and the second interface is a network adapter interface. The high-speed peripheral interface may be a thunderbolt interface.

In a possible embodiment, the NAS client receives a second DMAFS packet that is sent by the acceleration apparatus and that carries an operation result for the first DMAFS packet. The operation result includes the to-be-accessed target data in the first DMAFS packet and a directory and/or a file to which the target data belongs.

In a possible embodiment, before receiving the access request message, the NAS client needs to perform an initialization procedure: the NAS client first sends a third DMAFS packet to the acceleration apparatus, where the third DMAFS packet is used to request, from the acceleration apparatus, a directory that stores NAS data; and then receives mount directory information sent by the acceleration apparatus, and mounts the directory that stores NAS data and that is carried in the mount directory information onto a local directory.

In a possible embodiment, the NAS client updates the local directory of the NAS client according to information that is about the directory and/or the file to which the target data belongs and that is in the operation result.

According to the description in the foregoing method, after receiving an access request message of a user, a NAS client converts the access request message into a DMAFS packet in a preset file system format and sends the DMAFS packet to an acceleration apparatus, and the acceleration apparatus completes a protocol processing process of a NAS protocol stack. In this way, CPU and memory load of the NAS client is reduced, and processing efficiency of an overall NAS data access system is improved.

According to a second aspect, a NAS data access method is provided. The method is applied to a NAS data access system. The system includes a NAS client and an acceleration apparatus. The acceleration apparatus includes a first interface and a second interface, and the acceleration apparatus is connected to the NAS client by using the first interface and is connected to a NAS server by using the second interface. First, the acceleration apparatus receives a first DMAFS packet from the NAS client, and obtains an operation object and an operation type that are carried in the packet and that are for to-be-accessed target data. Then, the acceleration apparatus converts the operation object and the operation type into network file system NFS data, and then encapsulates the NFS data into a network protocol packet and sends the network protocol packet to the NAS server. In this way, a NAS data access process is completed.

A network transmission protocol may be the Transmission Control Protocol/Internet Protocol TCP/IP, the User Datagram Protocol/Internet Protocol UDP/IP, or Remote Direct Memory Access RDMA.

In the foregoing manner, data transmission is performed between a NAS client and an acceleration apparatus by using a DMAFS packet. After receiving the DMAFS packet, the acceleration apparatus further completes NAS protocol stack processing, and finally sends information about an operation object and an operation type that are for to-be-accessed target data to a NAS server in a format of a network protocol packet. In this way, CPU and memory load of the NAS client is reduced, a processing delay is reduced, and processing efficiency of an overall NAS data access system is improved.

In a possible embodiment, the first interface is a PCIe interface or a high-speed peripheral interface, and the second interface is a network adapter interface. The high-speed peripheral interface may be a thunderbolt interface.

In a possible embodiment, when a network protocol is TCP/IP, the acceleration apparatus first encapsulates the NFS data into a first external data representation XDR packet, then encapsulates the first XDR packet into a first remote procedure call RPC packet, finally encapsulates the first RPC packet into a first TCP/IP packet, and sends the first TCP/IP packet to the NAS server. In this way, data transmission between the acceleration apparatus and the NAS client is completed when the network protocol is TCP/IP.

In a possible embodiment, when a network protocol is UDP/IP, the acceleration apparatus first encapsulates the NFS data into a first external data representation XDR packet, then encapsulates the first XDR packet into a first RPC packet, finally encapsulates the first RPC packet into a first UDP/IP packet, and sends the first UDP/IP packet to the NAS server. In this way, data transmission between the acceleration apparatus and the NAS client is completed when the network protocol is UDP/IP.

In a possible embodiment, when a network protocol is RDMA, the acceleration apparatus first encapsulates the NFS data into a first external data representation XDR packet, then encapsulates the first XDR packet into a first remote procedure call RPC packet, then encapsulates the first RPC packet into a first RDMA packet, and sends the first RDMA packet to the NAS server. In this way, data transmission between the acceleration apparatus and the NAS client is completed when the network protocol is RDMA.

In a possible embodiment, before the acceleration apparatus receives the first DMAFS packet, the acceleration apparatus needs to complete a data initialization process, including: sending a first request message to the NAS server, receiving mount directory information that is sent by the NAS server and that is of a directory that stores NAS data, and mounting, according to the mount directory information, the directory that stores NAS data onto a local directory, where the first request message is used to request, from the NAS server, the directory that stores NAS data.

In a possible embodiment, after the acceleration apparatus completes the initialization process, the acceleration apparatus receives a third DMAFS packet sent by the NAS client, and the third DMAFS packet is used by the NAS client to request, from the acceleration apparatus, the directory that stores NAS data. The acceleration apparatus sends the mount directory information to the NAS client, so that the NAS client mounts, according to the mount directory information, the directory that stores NAS data onto a local directory.

In a possible embodiment, after receiving a network packet that carries an operation object and an operation type, the NAS server performs an operation of a read request or an operation of a write request on target data, and sends an operation result to the acceleration apparatus. The operation result includes the target data and a directory and/or a file to which the target data belongs. Correspondingly, the acceleration apparatus receives a network protocol packet that carries the operation result for the target data and that is sent by the NAS server. Then, the acceleration apparatus generates a second DMAFS packet according to a preset file system type. The preset file system type is used to describe a format of a DMAFS packet, and the second DMAFS packet includes the operation result. Then, the acceleration apparatus sends the second DMAFS packet to the NAS client.

In a possible embodiment, the acceleration apparatus further includes a data cache area, and the data cache area is used as a cache area of an NFS to store historical data of a processed access request message. For example, when a user performs an operation of a read request or an operation of a write request, target data of the operation of the read request or the operation of the write request may be stored in the data cache area. When there is a new access request, and to-be-accessed target data is stored in the data cache area, the acceleration apparatus performs an operation on the target data according to an operation object and an operation type, and sends an operation result for the target data to the NAS client.

Optionally, a capacity of data stored in the data cache area of the acceleration apparatus may be controlled by using a preset threshold. When the capacity in the cache area reaches the preset threshold, the acceleration apparatus may delete earliest stored historical data with a specified capacity according to a preset configuration.

In a possible embodiment, when the target data exists in the data cache area of the acceleration apparatus and the operation type is an operation of a read request, the acceleration apparatus may obtain the target data in the data cache area and a directory and/or a file to which the target data belongs, and then send the directory and/or the file to which the target data belongs and the target data to the NAS client. In this way, processing efficiency of the operation of the read request is improved, and a processing delay of the operation of the read request is reduced.

In a possible embodiment, when the target data exists in the data cache area of the acceleration apparatus and the operation type is an operation of a write request, the acceleration apparatus first obtains the target data, and performs the operation of the write request on the target data. Then, the acceleration apparatus sends the operation object and the operation type to the NAS server, and receives response information that is from the NAS server and that is of the operation of the write request performed on the target data, and the response information of the operation of the write request is used to indicate whether a write operation is successfully performed on the target data. The acceleration apparatus then sends the response information of the operation of the write request to the NAS client.

In a possible embodiment, when the target data does not exist in the data cache area, the acceleration apparatus first sends the operation object and the operation type to the NAS server, and then receives an operation result that is for the target data and that is sent by the NAS server.

In a possible embodiment, when the target data does not exist in the data cache area and the operation type is a read request, the acceleration apparatus first sends the operation object and the operation type to the NAS server. Then, the acceleration apparatus receives an operation result that is of the read request for the target data and that is sent by the NAS server, and the operation result of the read request includes the target data and a directory and/or a file to which the target data belongs. The acceleration apparatus then stores the operation result in the data cache area, and sends the operation result to the NAS client.

In a possible embodiment, when the target data does not exist in the data cache area and the operation type is a write request, the acceleration apparatus sends the operation object and the operation type to the NAS server, receives response information that is sent by the NAS server and that is of an operation of the write request performed on the target data, stores the target data in the data cache area, and sends the response information of a write operation to the NAS client.

In a possible embodiment, the acceleration apparatus updates the local directory of the acceleration apparatus according to information that is about the directory and/or the file to which the target data belongs and that is in the operation result.

In conclusion, after receiving an access request message of a NAS client, an acceleration apparatus continues to complete a protocol processing process, so as to complete data transmission with a NAS server. In this way, CPU load and memory usage of the NAS client, and a NAS data access delay are reduced. Further, accessed historical data is cached by using a data cache area of the acceleration apparatus, so that NAS data processing efficiency is improved, a data access delay is reduced, and processing efficiency of an overall NAS system is improved.

According to a third aspect, the present application provides a NAS data access system. The system includes a NAS client and an acceleration apparatus. The acceleration apparatus includes a first interface and a second interface, and the acceleration apparatus is connected to the NAS client by using the first interface and is connected to a NAS server by using the second interface. The NAS client is configured to perform an operation step according to any one of the first aspect or the possible embodiments of the first aspect, and the acceleration apparatus is configured to perform an operation step according to any one of the second aspect or the possible embodiments of the second aspect.

According to a fourth aspect, the present application provides a NAS client for NAS data access. The NAS client includes all modules configured to perform the NAS data access method according to any one of the first aspect or the possible embodiments of the first aspect.

According to a fifth aspect, the present application provides an acceleration apparatus for NAS data access. The acceleration apparatus includes all modules configured to perform the NAS data access method according to any one of the second aspect or the possible embodiments of the second aspect.

According to a sixth aspect, the present application provides a NAS client for NAS data access. The NAS client includes a processor, a storage, and a communications bus. The processor and the storage are connected by using the communications bus to implement mutual communication. The storage is configured to store a computer execution instruction, and when the NAS client is running, the processor executes the computer execution instruction in the storage to perform the method according to any one of the first aspect or the possible embodiments of the first aspect by using a hardware resource in the NAS client.

According to a seventh aspect, a computer readable medium is provided, and is configured to store a computer program. The computer program includes an instruction used to perform the method according to any one of the first aspect or the possible embodiments of the first aspect.

According to an eighth aspect, the present application provides an acceleration apparatus for NAS data access. The acceleration apparatus includes a processor, a storage, a user interface, a network interface, and a communications bus. The acceleration apparatus is connected to a NAS client by using the user interface and is connected to a NAS server by using the network interface. The processor, the storage, the user interface, and the network interface are connected by using the communications bus to implement mutual communication. The storage is configured to store a computer execution instruction, and when the acceleration apparatus is running, the processor executes the computer execution instruction in the storage to perform the method according to any one of the second aspect or the possible embodiments of the second aspect by using a hardware resource in the acceleration apparatus.

According to a ninth aspect, a computer readable medium is provided, and is configured to store a computer program. The computer program includes an instruction used to perform the method according to any one of second aspect or the possible embodiments of the second aspect.

Based on the foregoing technical solutions, according to the method, the system, and the related device for NAS data access in the embodiments of the present application, a protocol processing process of a NAS protocol stack performed by a NAS client is completed by using an acceleration apparatus, so that CPU and memory load of the NAS client is reduced. The acceleration apparatus and the client communicate by using a PCIe interface or a high-speed peripheral interface, and perform data transmission by using a DMAFS packet, so as to reduce a processing delay. Further, historical data is cached by using a data cache area of the acceleration apparatus, so that efficiency of data read processing in a data access process can be improved. In this way, overall performance and data access efficiency of the NAS client can be improved.

Based on the embodiments provided in the foregoing aspects, in this application, the embodiments may be further combined to provide more embodiments.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DESCRIPTION OF EMBODIMENTS

Embodiments of a NAS data access method are provided in the present application and described below with reference to the accompanying drawings.

Figure 2A:
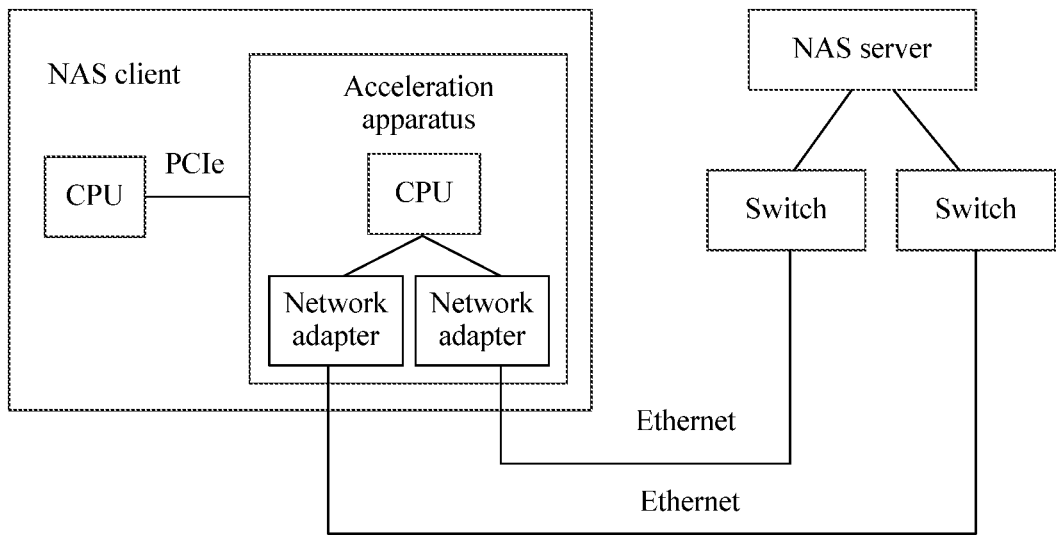
FIG. 2A is a schematic diagram of a hardware structure of a NAS system according to the present application.

FIG. 2A is a logical block diagram of a NAS data access system according to an embodiment of the present application. As shown in the figure, the system includes a NAS client and an acceleration apparatus. The acceleration apparatus is connected to the NAS client by using a peripheral component interconnect express (PCIe) interface and is connected to a NAS server by using a network adapter. The acceleration apparatus and the NAS client each belong to one endpoint device in a PCIe topology structure, and the acceleration apparatus and the NAS client communicate by using a PCIe bus.

Figure 2B:
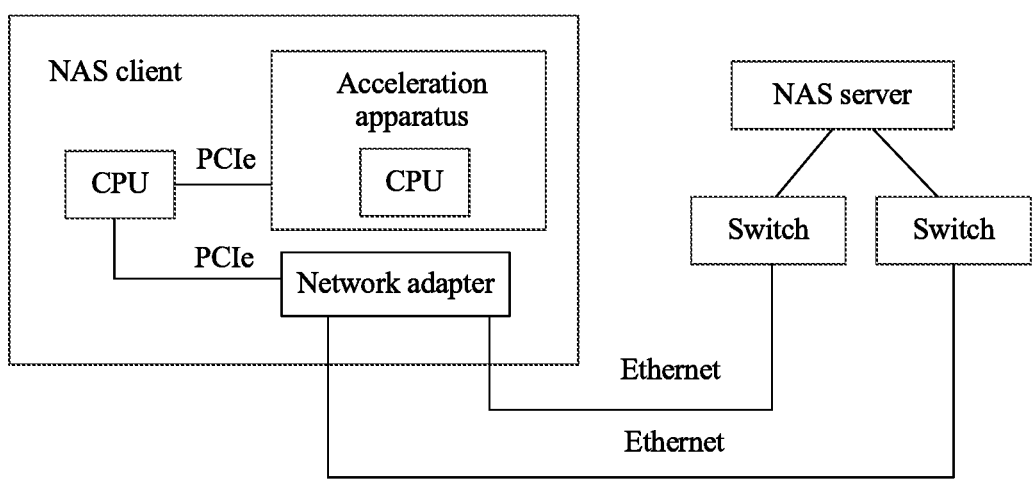
FIG. 2B is a schematic diagram of a hardware structure of another NAS system according to the present application.

Optionally, FIG. 2B is a logical block diagram of another NAS data access system according to the present application. As shown in the figure, different from FIG. 2A, a network adapter may not be configured for an acceleration apparatus. After connected to a NAS client by using PCIe, the acceleration apparatus performs data transmission with a NAS server by using a network adapter of the NAS client.

Optionally, in the logical block diagram of the NAS data access system shown in FIG. 2B, a central processing unit (CPU) may be added to the network adapter of the NAS client, so that the network adapter is used as an acceleration apparatus, is connected to the NAS client by using a PCIe interface, and is connected to the NAS server by using a network adapter interface of the NAS client.

Figure 2C:
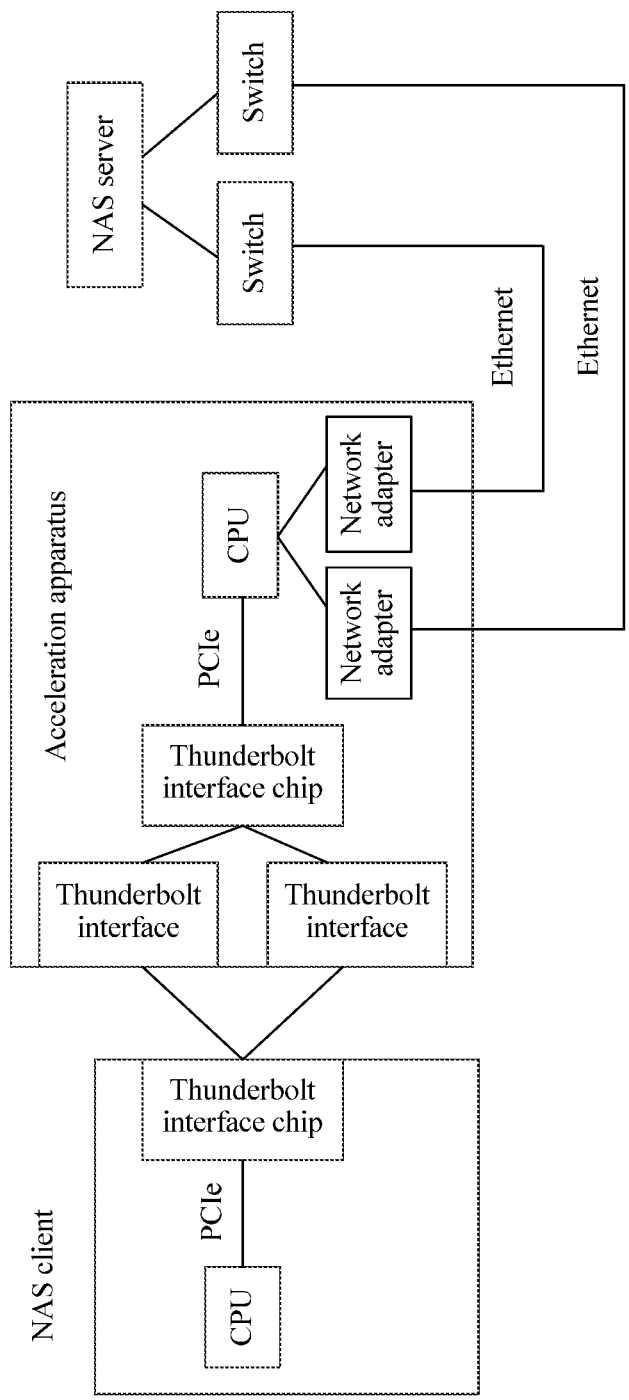
FIG. 2C is a schematic diagram of a hardware structure of another NAS system according to the present application.

FIG. 2C is a logical block diagram of another NAS data access system according to an embodiment of the present application. As shown in the figure, when a NAS client is a client machine that imposes a strict limitation on a machine body, for example, when the NAS client is a MAC Pro, a common PCIe interface is hardly to be inserted into the NAS client. In this case, an acceleration apparatus may be connected to the NAS client by using a high-speed peripheral interface. For example, the high-speed peripheral interface is a thunderbolt (thunderbolt) interface. The acceleration apparatus communicates with a NAS server by using a network adapter of the acceleration apparatus. As shown in FIG. 2C, if the high-speed peripheral interface is a thunderbolt interface, a connection between thunderbolt interfaces needs to be controlled by using a thunderbolt interface chip.

Figure 2D:
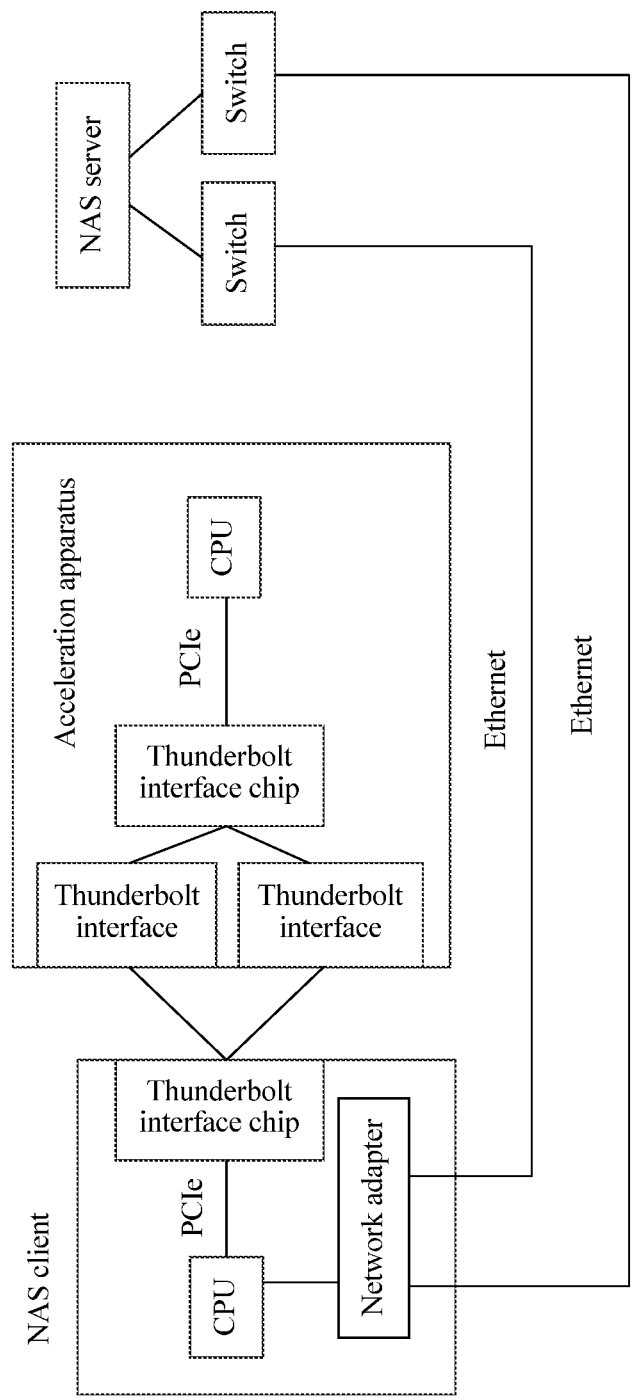
FIG. 2D is a schematic diagram of a hardware structure of another NAS system according to the present application.

Optionally, as shown in FIG. 2D, a network adapter may not be configured for an acceleration apparatus. After connected to a NAS client by using a high-speed peripheral interface, the acceleration apparatus communicates with a NAS server by using a network adapter of the NAS client.

It should be noted that the acceleration apparatus and the NAS server that are shown in FIG. 2A to FIG. 2D may be connected by using the Ethernet shown in the figure or a network of another network type, for example, lossless Ethernet data center bridging (DCB), and this imposes no limitation on the present application.

Figure 3:
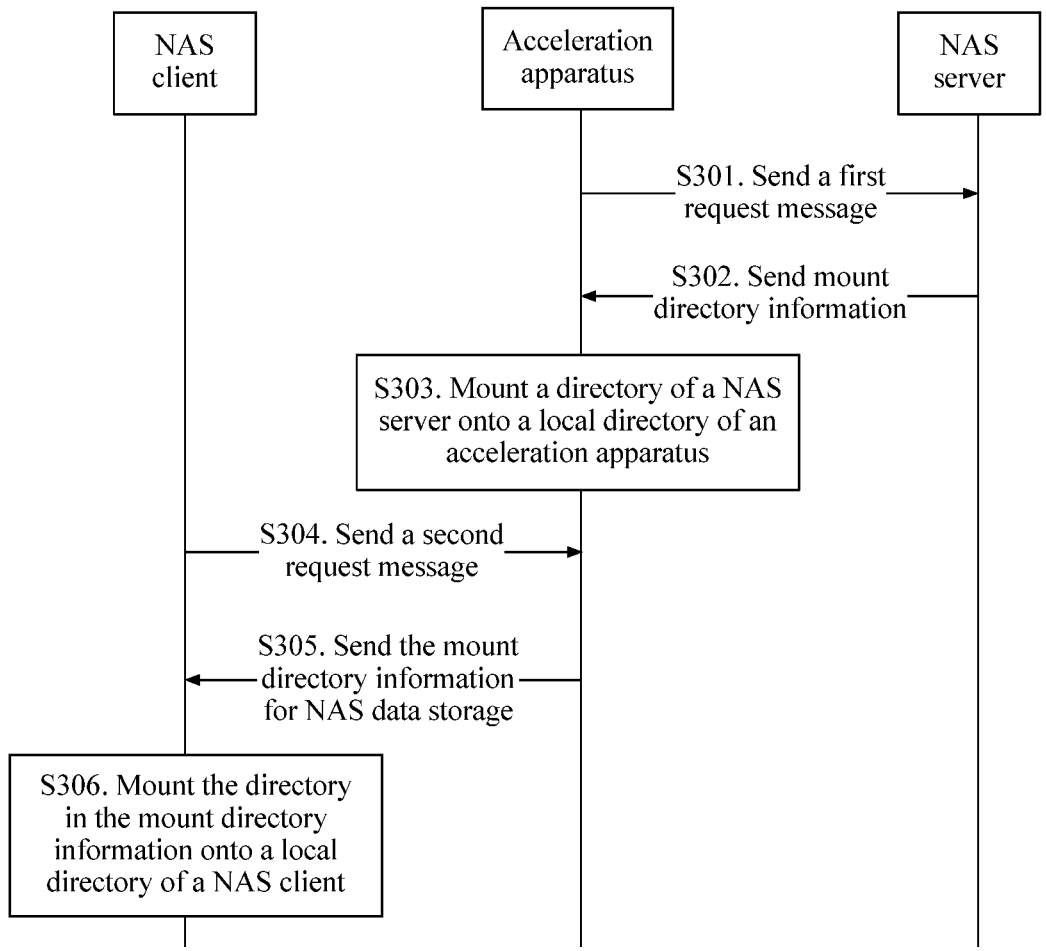
FIG. 3 is a schematic flowchart of an initialization operation of a NAS data access method according to the present application.

In the present application, the acceleration apparatus shown in FIG. 2A to FIG. 2D is added, so that protocol processing in a NAS data access process is completed by using the acceleration apparatus. In this way, a protocol processing process of a NAS client is simplified, and further, CPU and memory losses of the NAS client are reduced. A NAS data access method provided in the present application is further described below with reference to FIG. 3. As shown in the figure, before the NAS client accesses NAS data, the NAS client, the acceleration apparatus, and a NAS server need to perform initialization operations. Initialization operation steps of the method include the following steps.

S301. The acceleration apparatus sends a first request message to the NAS server.

Specifically, the first request message is used to request the NAS server to send a directory that stores NAS data to the acceleration apparatus.

Optionally, the acceleration apparatus may request, according to a preset configuration, the NAS server to send information about a directory of a specified level. For example, as required by the preset configuration, during initialization, the NAS server is requested to send only information about a level 1 root directory that stores NAS data. Alternatively, as required by the preset configuration, during initialization, the NAS server is requested to send information about all directories that store NAS data to the acceleration apparatus.

A protocol processing process is used between the acceleration apparatus and the NAS server. If a network protocol used between the acceleration apparatus and the NAS server is the Transmission Control Protocol/Internet Protocol (TCP/IP), that is, data transmission is performed by using a protocol stack shown in FIG. 1B, the acceleration apparatus first converts to-be-transmitted data into NFS data, for example, converts an access request message of a user into a related parameter that can be identified by an NFS, and locally parses a name of a to-be-operated file. Then, the acceleration apparatus encapsulates the NFS data into an XDR packet, including encapsulating a request parameter into a specific location of the packet. Then, the acceleration apparatus encapsulates the XDR packet into an RPC packet, and an encapsulation process includes adding information such as an RPC sequence number and a check code to the XDR packet. Finally, the acceleration apparatus encapsulates the RPC packet into a TCP/IP packet and transmits the TCP/IP packet to the NAS server by using a network adapter. In this way, a protocol processing process of NAS data access is compatible. Correspondingly, the NAS server sequentially parses, in a reverse order, the TCP/IP packet sent by the acceleration apparatus, processes a request message in the packet, and sends a processing result to the acceleration apparatus.

Optionally, when the acceleration apparatus and the NAS server perform data transmission by using the User Datagram Protocol/Internet Protocol (UDP/IP), the acceleration apparatus first converts to-be-transmitted data into NFS data, then encapsulates the NFS data into an XDR packet, then encapsulates the XDR packet into an RPC packet, and finally encapsulates the RPC packet into a UDP/IP packet and transmits the UDP/IP packet to the NAS server by using a network adapter. Correspondingly, the NAS server sequentially parses, in a reverse order, the UDP/IP packet sent by the acceleration apparatus, processes a request message in the packet, and sends a processing result to the acceleration apparatus.

Optionally, when the acceleration apparatus and the NAS server perform data transmission by using Remote Direct Memory Access (RDMA), the acceleration apparatus first converts to-be-transmitted data into NFS data, then encapsulates the NFS data into an XDR packet, then encapsulates the XDR packet into an RPC packet, and finally encapsulates the RPC packet into an RDMA packet and transmits the RDMA packet to the NAS server by using a network adapter. Correspondingly, the NAS server sequentially parses, in a reverse order, the RDMA packet sent by the acceleration apparatus, processes a request message in the packet, and sends a processing result to the acceleration apparatus.

It should be noted that when different network protocols are used between the NAS server and the acceleration apparatus, the protocols are used in encapsulation and parsing processes of each layer of protocol packet, and details are not described herein.

S302. The acceleration apparatus receives mount directory information sent by the NAS server.

Specifically, when the NAS server and the acceleration apparatus perform data transmission by using different network protocols, after receiving a network protocol packet that carries the mount directory information and that is sent by the NAS server, the acceleration apparatus parses the packet and obtains the mount directory information. The mount directory information includes a directory that stores NAS data and that is in the NAS server.

S303. The acceleration apparatus mounts a directory in the mount directory information onto a local directory of the acceleration apparatus.

Specifically, the acceleration apparatus generates a data structure of the local directory in memory according to the mount directory information, and mounts the directory that stores NAS data and that is in the mount directory information onto the local directory of the acceleration apparatus by calling a pointer function.

S304. The NAS client sends a second request message to the acceleration apparatus.

Specifically, the second request message is used by the NAS client to request the acceleration apparatus to send the directory that stores NAS data and that is in the NAS server to the NAS client.

Optionally, the NAS client may request, according to a preset configuration, the acceleration apparatus to send information about a directory that stores NAS data and that is of a specified level. For example, as required by the preset configuration, during initialization, the acceleration apparatus is requested to send only information about a level 1 root directory that stores NAS data. Alternatively, as required by the preset configuration, during initialization, the acceleration apparatus is requested to send information about all directories that store NAS data to the NAS client.

It should be noted that the NAS client and the acceleration apparatus may select to mount directories of a same level in the information about a directory that stores NAS data onto local directories, or may select, according to the preset configuration and a condition such as operation rights of a user, to mount directories of different levels in the information about a directory that stores NAS data onto local directories.

Further, the NAS client and the acceleration apparatus perform data transmission by using a DMA controller. That is, the NAS client converts to-be-sent data into a format described by using a preset file system type, generates a direct memory access file system (DMAFS) packet, and instructs the DMA controller to send the packet to the acceleration apparatus. The DMA controller may be implemented by the acceleration apparatus. When the NAS client needs to send the DMAFS packet generated by the NAS client to the acceleration apparatus, a processor of the NAS client instructs, by using an instruction (for example, a PCIe instruction), the DMA controller to send the DMAFS packet generated by the NAS client to the acceleration apparatus. When the acceleration apparatus needs to send a DMAFS packet generated by the acceleration apparatus to the NAS client, a processor of the acceleration apparatus instructs the DMA controller to send the DMAFS packet generated by the acceleration apparatus to the NAS client. In this way, a NAS protocol processing process is transferred from the NAS client to the acceleration apparatus, so that CPU and memory load of the NAS client is reduced.

Optionally, a function of the DMA controller may be implemented by the NAS client. When the NAS client needs to send a DMAFS packet generated by the NAS client to the acceleration apparatus, a processor of the NAS client instructs, by using an instruction (for example, a PCIe instruction), the DMA controller to send the DMAFS packet generated by the NAS client to the acceleration apparatus. When the acceleration apparatus needs to send a DMAFS packet generated by the acceleration apparatus to the NAS client, a processor of the acceleration apparatus instructs the DMA controller to send the DMAFS packet generated by the acceleration apparatus to the NAS client.

The preset file system type is used to describe a format of a DMAFS packet. The preset file system type may be implemented by using a DMAFS that runs on the processor of the NAS client and that is adapted to a virtual file system (VFS) layer. The DMAFS includes a specific function of a corresponding operation that is performed on a data request message. According to the function, the data request message may be converted into the format described by using the preset file system type. For example, the function is a function corresponding to a write operation, a function corresponding to a read operation, a function corresponding to directory creation, a function corresponding to a delete operation, or a file offset function. The specific function is not limited in this embodiment of the present application. For details, refer to a specific function corresponding to each operation in the common methods.

For example, one file system type and four object structures are defined in a preset file system DMAFS. The object structures include a superblock object, an inode (inode) object, a directory entry (dentry) object, and a file object. The file system type is used to define, from a perspective of a system layer, various functions used by the file system, and a reference relationship between the functions. The superblock object is used to manage the current file system, including a total quantity of inodes, a total quantity of blocks (block), and inode use and distribution. The inode mainly indicates storage space of a file or a directory, and a corresponding file operation, for example, changing a file name, creating a link file, and changing file permission. The file object mainly indicates an operation of an opened file and directory, for example, read and write of file content. The inode object is used to record an index relationship between a directory and a file in the file system. The directory entry object is mainly used to cache directory information, so that a file or a directory can be quickly accessed. In a data processing process, a request message is processed by using a function defined by the file system, so as to output a pre-defined file format.

Figure 3A:
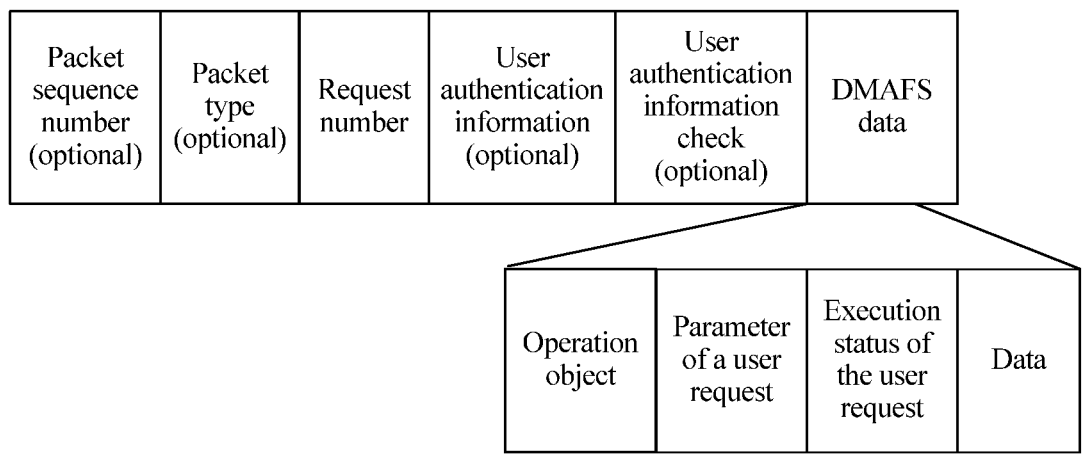
FIG. 3A is a schematic diagram of a DMAFS packet format according to the present application.

Optionally, a packet in a DMAFS format is shown in FIG. 3A. The packet in the DMAFS format includes a request number and DMAFS data. The request number is used to identify a number of a request processed by a DMAFS system. The DMAFS data includes an operation object, a parameter of a user request, and an execution status of the user request, and data. The parameter of the user request includes a type of the user request (for example, read only or write only), a length of read/write data, and an offset of the read/write data. The execution status of the user request is used to identify an execution result (for example, successful or failed) of the user request. The data is used to represent target data corresponding to an operation of a read request or an operation of a write request. For example, when the user request is the operation of the read request for the target data, a "data" field in a DMAFS packet that is sent by the NAS client to the acceleration apparatus is empty, and the target data is stored in a "data" field in a DMAFS packet that is sent by the acceleration apparatus to the NAS client. When the user request is the operation of the write request for the target data, the target data is stored in a "data" field in a DMAFS packet that is sent by the NAS client to the acceleration apparatus, and a "data" field in a DMAFS packet that is sent by the acceleration apparatus to the NAS client is empty.

Optionally, the DMAFS packet may further include a packet sequence number, a packet type, user authentication information, and a user authentication information check value. The packet sequence number is used to identify a sending order of each packet, the packet type is used to identify the packet as the DMAFS packet, the user authentication information is used to identify authentication information of user access rights of the NAS client, and the user authentication information check value is used to check the user authentication information.

S305. The acceleration apparatus sends the mount directory information for NAS data storage to the NAS client.

The mount directory information is the mount directory information sent by the NAS server to the acceleration apparatus in step S302.

It should be noted that a preset file system may also run on the processor of the acceleration apparatus, and is used to convert to-be-sent data into a preset file system type. The file system is the same as that in step S304, and details are not described herein again.

S306. The NAS client mounts the directory in the mount directory information onto a local directory of the NAS client.

Specifically, the NAS client generates a data structure of the local directory according to the mount directory information, and mounts the directory that stores NAS data and that is in the mount directory information onto the local directory of the NAS client by sequentially calling a pointer function.

According to the description in the foregoing step S301 to step S306, a NAS client, an acceleration apparatus, and a NAS server complete an initialization process, and a directory that stores NAS data is mounted onto a local directory, facilitating subsequent NAS data access.

Figure 4:
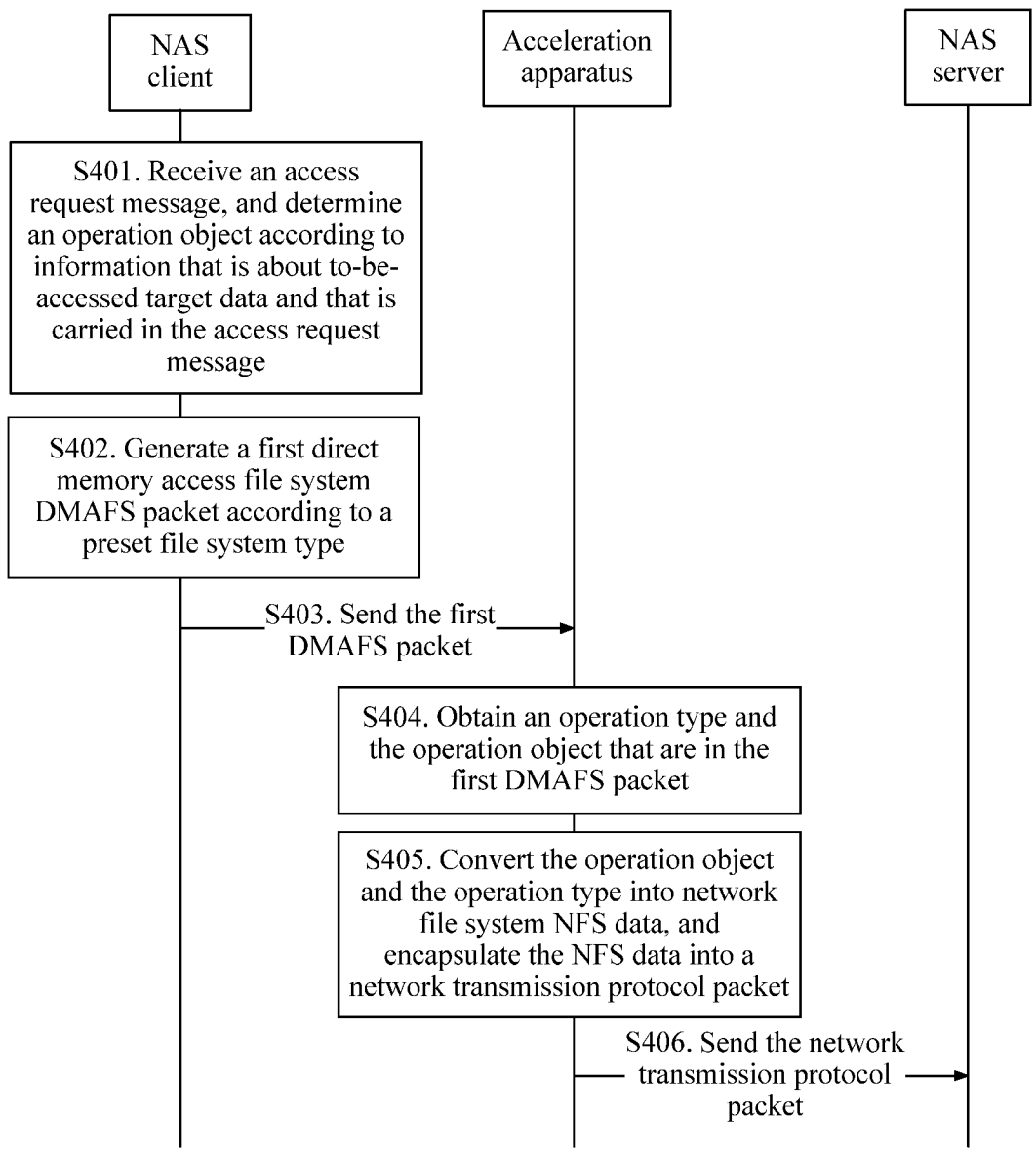
FIG. 4 is a schematic flowchart of another NAS data access method according to the present application.

Further, FIG. 4 is a schematic flowchart of a NAS data access method according to the present application. As shown in the figure, the method includes the following steps.

S401. A NAS client receives an access request message, and determines an operation object according to information that is about to-be-accessed target data and that is carried in the access request message.

Specifically, the access request message carries the information that is about to-be-accessed target data and an operation type. The NAS client determines the operation object according to the information that is about to-be-accessed target data and that is carried in the access request message, and the operation object includes a directory and/or a file to which the target data belongs.

In a NAS system, target data information in an access request message of a user received by the NAS client is a character string, but a file system can identify only index information of a file and a directory. Therefore, after receiving the access request message of the user, the NAS client determines, according to the information about to-be-accessed target data by using a function of a preset file system, an operation object, that is, a directory and/or a file to which the to-be-accessed target data belongs.

For example, if the to-be-accessed target data in the access request message of the user is /Root/Dir_a/File_b, the NAS client sequentially executes the following instructions by using a read function in a DMAFS: first reading directory information and file information included in a Root directory, then reading directory information and file information included in a Root/Dir_a directory, and finally determining that a File_b file exists in the Root/Dir_a directory. In this case, the NAS client converts character string information of the target data in the access request message of the user into file information and directory information that can be identified by an NFS.

Figure 1A:
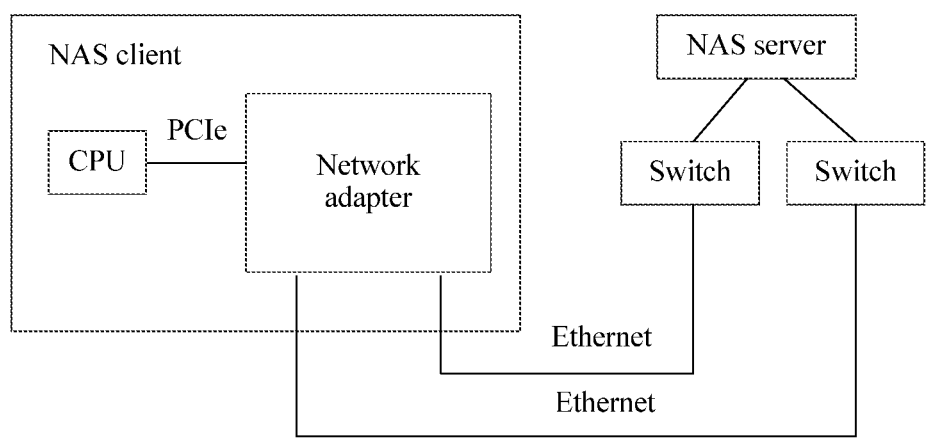
FIG. 1A is a schematic diagram of a NAS system architecture in the prior art according to the present application.
Figure 1B:
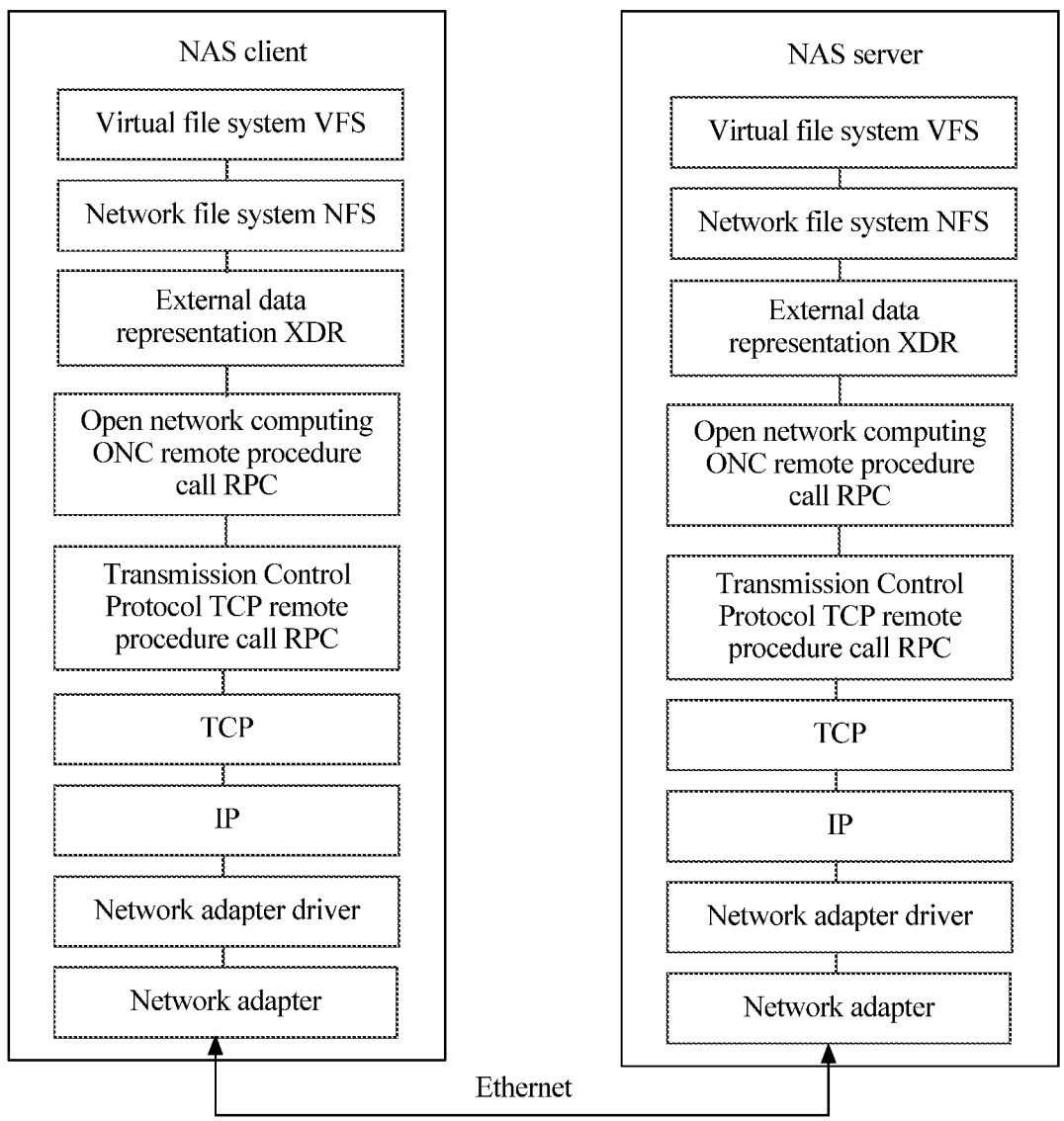
FIG. 1B is a schematic diagram of a NAS system protocol stack in the prior art according to the present application.

It should be noted that in a NAS protocol stack shown in FIG. 1B, after receiving the access request message of the user, the NAS client forwards data by using a VFS layer. The VFS provides a unified operation interface and an application programming interface for various file systems, and is an adhesive layer on which a read or write request can be operated regardless of an underlying storage medium and a file system type. That is, the VFS layer mainly completes forwarding of the access request message, but does not process the access request message.

S402. The NAS client generates a first DMAFS packet according to a preset file system type.

Specifically, the preset file system type is used to describe a format of a DMAFS packet, and the first DMAFS packet includes the operation object and the operation type.

It should be noted that the format of the DMAFS packet is the same as that in an operation process in step S304, and details are not described herein again.

S403. The NAS client sends the first DMAFS packet to an acceleration apparatus.

S404. The acceleration apparatus obtains an operation type and the operation object that are in the first DMAFS packet.

S405. The acceleration apparatus converts the operation object and the operation type into network file system NFS data, and encapsulates the NFS data into a network protocol packet.

Specifically, to make a NAS protocol stack processing process compatible, a protocol processing process is still used between the acceleration apparatus and a NAS server. That is, after obtaining the operation type and the operation object that are sent by the NAS client, the acceleration apparatus first performs an NFS layer data conversion process, for example, obtains related parameters (for example, an address for receiving data) of the operation object and the operation type, and stores parameter information in an associated data structure. Then, the acceleration apparatus encapsulates NFS data into a network protocol packet. A network protocol may be TCP/IP, UDP/IP, or RDMA.

It should be noted that a process in which the acceleration apparatus converts the operation object and the operation type that are in the access request message into the network protocol packet is performed using a common technique, and is the same as that in step S301, and details are not described herein again.

S406. The acceleration apparatus sends the network protocol packet to a NAS server.

The network protocol packet varies according to a network protocol, and may be a TCP/IP packet in step S405, or may be a UDP/IP packet or an RDMA packet.

Further, after receiving the network protocol packet, the NAS server performs an operation of a read request or an operation of a write request on the target data according to the operation object and the operation type that are carried in the network protocol packet, and returns an operation result for the target data to the acceleration apparatus. The acceleration apparatus then returns the operation result to the NAS client.

Figure 5:
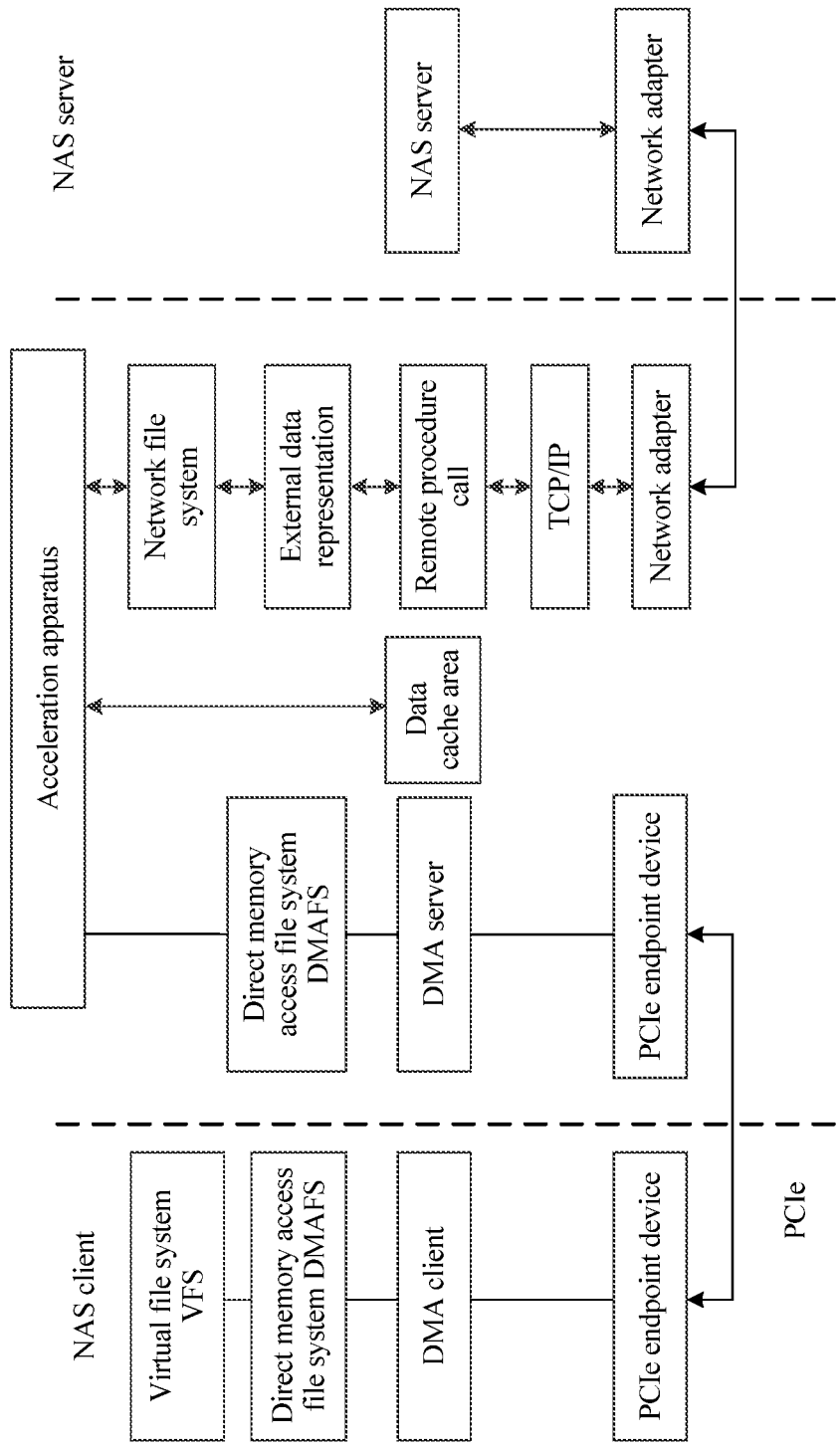
FIG. 5 is a schematic diagram of a NAS system protocol stack according to the present application.

FIG. 5 is a schematic diagram of a simplified protocol stack based on the TCP/IP network protocol. It can be learned from comparison with FIG. 1B that, for a NAS client, a data access request does not need to undergo NFS, XDR, RPC, and TCP/IP processing processes, but is directly sent to an acceleration apparatus in a DMA manner. The acceleration apparatus further completes a protocol processing process of another part. Therefore, compared with a protocol stack provided in the prior art, in this embodiment of the present application, a protocol processing process of the NAS client is unloaded by using the acceleration apparatus, so that the protocol processing process of the NAS client can be simplified, and CPU load of the NAS client is reduced.

FIG. 5 is an example in which a DMA controller is implemented by the acceleration apparatus. In this case, a DMA server is deployed on the acceleration apparatus side, and a DMA client is deployed on the NAS client side. Correspondingly, when a DMA controller is implemented by the NAS client, a DMA server is on the NAS client side, and a DMA client is on the acceleration apparatus side.

Optionally, when a data transmission protocol used between the NAS server and the acceleration apparatus is UDP/IP or RDMA, compared with a protocol processing process in the prior art, a protocol processing process is unloaded from the NAS client to the acceleration apparatus, and the acceleration apparatus completes a conversion process from an NFS to UDP/IP or from an NFS to RDMA, so that the protocol processing process of the NAS client can be simplified, and CPU load of the NAS client is reduced.

According to the description in the foregoing step S401 to step S406, an acceleration apparatus is added to a NAS client, and the acceleration apparatus completes a protocol processing process below an NFS layer in an existing protocol stack, so as to resolve a problem, caused by complex protocol processing, that the NAS client has heavy CPU load, high memory usage, and a long processing delay, and improve overall performance and data access efficiency of the NAS client. Further, data transmission is performed between the NAS client and the acceleration apparatus by using a DMA engine. A CPU does not participate in a DMA data transmission process. In this way, CPU resource usage is greatly reduced, so that CPU efficiency is improved, and a NAS data access delay is reduced.

In a possible embodiment, the acceleration apparatus may further include a data cache area, which is used as a cache area of an NFS, to resolve problems of a small cache capacity of the NFS, a low hit ratio, and a long delay. A NAS data access processing process performed when an operation type is a read request and a NAS data access processing process performed when an operation type is a write request are respectively described below with reference to FIG. 6A and FIG. 6B.

Figure 6A:
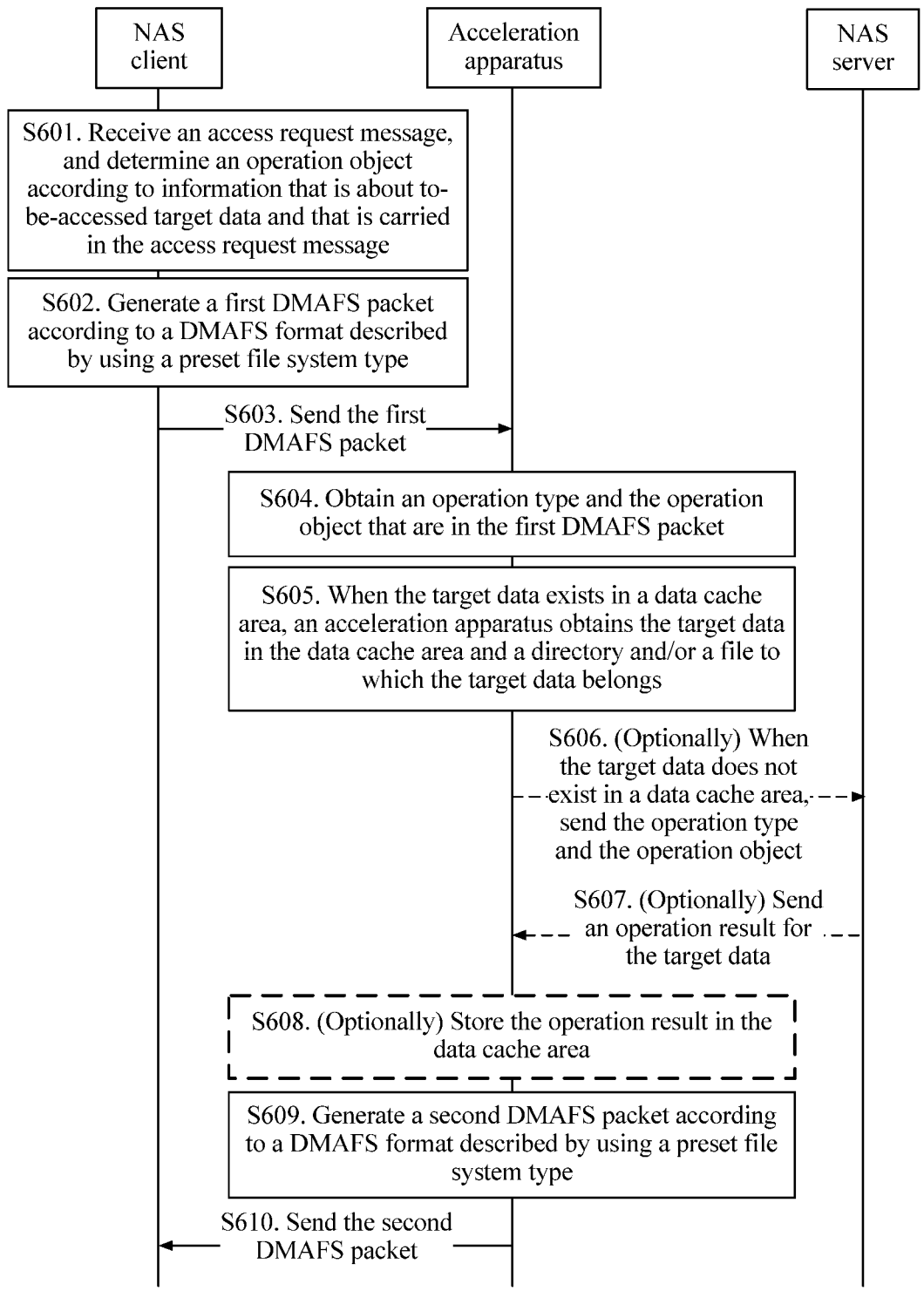
FIG. 6A is a schematic flowchart of a NAS data access method according to the present application.

FIG. 6A is a schematic flowchart of a NAS data access method performed when an operation type is a read request according to the present application. As shown in the figure, the method includes the following steps.

S601. A NAS client receives an access request message, and determines an operation object according to information that is about to-be-accessed target data and that is carried in the access request message.

S602. The NAS client generates a first DMAFS packet according to a preset file system type.

S603. The NAS client sends the first DMAFS packet to an acceleration apparatus.

S604. The acceleration apparatus obtains an operation type and the operation object that are in the first DMAFS packet.

Processing processes of steps S601 to S604 are the same as those of steps S401 to S404, and details are not described herein again.

S605. When the target data exists in a data cache area, the acceleration apparatus obtains the target data in the data cache area and a directory and/or a file to which the target data belongs.

Specifically, the data cache area of the acceleration apparatus may store accessed NAS data and historical data of a directory and/or a file to which the data belongs. When the to-be-accessed target data is historical data, the data may be directly obtained from the data cache area of the acceleration apparatus. In this way, NAS data access efficiency is improved, a data access delay is reduced, and step S609 is performed. When the target data does not exist in the data cache area, step S606 to step S609 are performed.

Optionally, a capacity of data stored in the data cache area of the acceleration apparatus may be controlled by using a preset threshold. When the capacity in the cache area reaches the preset threshold, the acceleration apparatus may delete earliest stored historical data with a specified capacity according to a preset configuration.

S606. (Optionally) When the target data does not exist in a data cache area, send the operation type and the operation object to a NAS server.

Specifically, when the target data does not exist in the data cache area of the acceleration apparatus, the acceleration apparatus sends, according to a protocol processing process and by using the method shown in step S405 and step S406, a network protocol packet that carries the operation type and the operation object to the NAS server.

S607. (Optionally) The NAS server sends an operation result for the target data to the acceleration apparatus.

Specifically, after receiving the network protocol packet that carries the operation object and the operation type and that is sent in step S606, the NAS server parses the packet, performs an operation on the target data according to the operation type and the operation object that are carried in the packet, and encapsulates an operation result into a network protocol packet and sends the network protocol packet to the acceleration apparatus. The operation result includes the target data and the directory and/or the file to which the target data belongs.

It should be noted that encapsulation and parsing processes of the network protocol packet used for data transmission between the NAS server and the acceleration apparatus in step S606 and step S607 are the same as those in step S301 and step S302, and details are not described herein again.

S608. (Optionally) The acceleration apparatus stores the operation result in the data cache area.

S609. The acceleration apparatus generates a second DMAFS packet according to a preset file system type.

The second DMAFS packet includes the operation result, that is, the second DMAFS packet includes the target data and the directory and/or the file to which the target data belongs. A generation process of the second DMAFS packet is the same as that in step S402, and details are not described herein again.

S610. The acceleration apparatus sends the second DMAFS packet to the NAS client.

Further, when the target data is not stored in the data cache area of the acceleration apparatus, the acceleration apparatus updates local directory information according to the operation result. An update process is the same as the method in step S303, and details are not described herein again. Correspondingly, the NAS client also updates local directory information according to the operation result. An update process is the same as the method in step S306, and details are not described herein again.

Figure 6B:
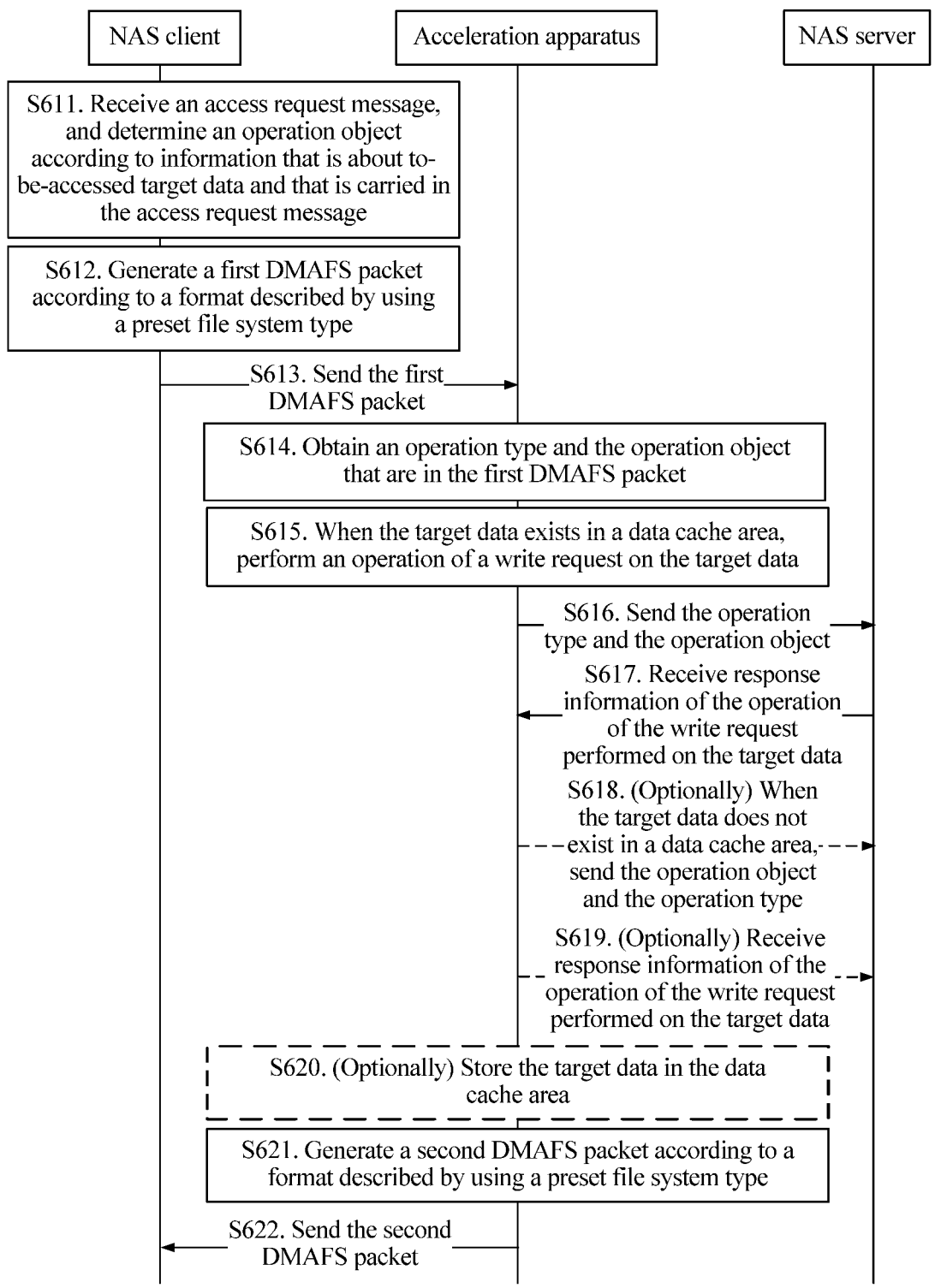
FIG. 6B is a schematic flowchart of another NAS data access method according to the present application.

In a possible embodiment, FIG. 6B is a schematic flowchart of a NAS data access method performed when an operation type is a write request. As shown in the figure, the method includes the following steps.

S611. A NAS client receives an access request message, and determines an operation object according to information that is about to-be-accessed target data and that is carried in the access request message.

S612. The NAS client generates a first DMAFS packet according to a preset file system type.

S613. The NAS client sends the first DMAFS packet to an acceleration apparatus.

S614. The acceleration apparatus obtains an operation type and the operation object that are in the first DMAFS packet.

It should be noted that processing processes of steps S611 to S614 are the same as those of steps S401 to S404, and details are not described herein again.

S615. When the target data exists in a data cache area, the acceleration apparatus performs an operation of a write request on the target data.

When the target data exists in the data cache area, the acceleration apparatus performs the operation of the write request on the target data according to the operation type.

S616. The acceleration apparatus sends the operation type and the operation object to a NAS server.

Specifically, accessed historical data is stored in the data cache area of the acceleration apparatus. When the operation type is a write operation, after modifying data in the data cache area, the acceleration apparatus further needs to send the operation type and the operation object to the NAS server, so that the NAS server performs the write operation on the stored target data.

S617. The acceleration apparatus receives response information that is sent by the NAS server and that is of the operation of the write request performed on the target data.

Specifically, after performing the operation of the write request on the target data, the NAS server sends the response information of the operation of the write request to the acceleration apparatus. The response information is used to indicate whether the write operation is successfully performed on the target data.

It should be noted that in step S617, the NAS server sends the response information to the acceleration apparatus by using a network protocol packet. A specific process is the same as step S301, and details are not described herein again.

When the target data does not exist in the data cache area, an operation process of step S618 is performed.

S618. (Optionally) When the target data does not exist in a data cache area, the acceleration apparatus sends the operation type and the operation object to a NAS server.

S619. (Optionally) The acceleration apparatus receives response information that is sent by the NAS server and that is of a write operation performed on the target data.

S620. (Optionally) The acceleration apparatus stores the target data in the data cache area.

Specifically, for an operation of a write request, after receiving response information that is from the NAS server and that is of the operation of the write request performed on the target data, the acceleration apparatus stores the target data in the data cache area, that is, stores the target data and information about a directory and/or a file to which the target data belongs in the data cache area. In this way, when an operation of a read request is subsequently performed, the target data can be quickly found from the data cache area, so that data read performance is improved.

S621. The acceleration apparatus generates a second DMAFS packet according to a preset file system type.

S622. The acceleration apparatus sends the second DMAFS packet to the NAS client.

Operation processes of steps S621 to S622 are the same as those of steps S609 to S610, and details are not described herein again.

Further, when the target data is not stored in the data cache area of the acceleration apparatus, the acceleration apparatus updates local directory information according to an operation result. An update process is the same as the method in step S303, and details are not described herein again. Correspondingly, the NAS client also updates local directory information according to the operation result. An update process is the same as the method in step S306, and details are not described herein again.

In conclusion, by means of a process in which an acceleration apparatus unloads a NAS client protocol, a prior-art problem that a NAS client has heavy CPU load, high memory usage, and a long processing delay in a NAS data access process is resolved. Further, historical data is stored by using a data cache area of the acceleration apparatus, so that an access delay in a read processing process can be reduced, and read processing efficiency of NAS data access is improved. In common methods, in the media assets industry, a small cache capacity associated with a network file system caused by a limited cache area of the NAS client causes problems of a low hit ratio and a long data access delay. In comparison, a cache associated with the network file system is relocated to the acceleration apparatus by using the acceleration apparatus, and an access request delivered from a VFS is not cached in the NAS client. In this way, the prior-art problems of a low hit ratio and a long data access delay caused by the small cache capacity associated with the network file system are resolved, so that processing efficiency of NAS data access is improved.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

It should be noted that, for brief description, the foregoing method embodiments are represented as a series of actions. However, a person skilled in the art should understand that the present application is not limited to the described order of the actions. In addition, a person skilled in the art should also understand that all the embodiments described in the specification are illustrative embodiments, and the actions mentioned are not necessarily required by the present application.

Another reasonable step combination figured out by a person skilled in the art according to the foregoing described content also falls within the protection scope of the present application. In addition, a person skilled in the art should also understand that all the embodiments described in the specification are illustrative embodiments, and the actions mentioned are not necessarily required by the present application.

A NAS data access method provided in the embodiment of the present application is described above in detail with reference to FIG. 2A to FIG. 6B. A NAS client and an acceleration apparatus for NAS data access provided in embodiments of the present application are described below with reference to FIG. 7 to FIG. 10.

Figure 7:
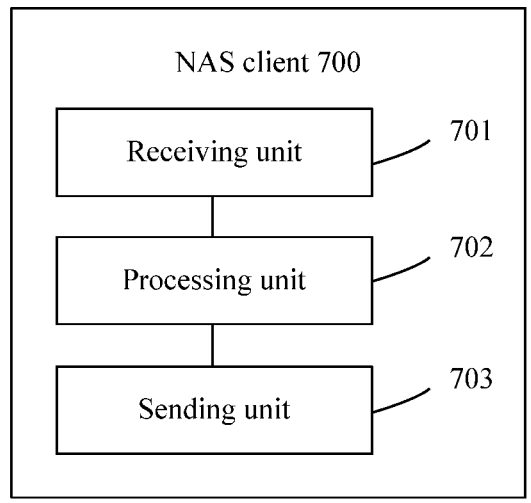
FIG. 7 is a schematic diagram of a NAS client according to the present application.

FIG. 7 is a schematic diagram of a NAS client 700 according to the present application. As shown in the figure, the NAS client 700 includes a receiving unit 701, a processing unit 702, and a sending unit 703.

The receiving unit 701 is configured to receive an access request message of a user.

The processing unit 702 is configured to: determine an operation object according to information that is about to-be-accessed target data and that is carried in the access request message received by the receiving unit 701, where the operation object includes a directory and/or a file to which the target data belongs; and generate a first DMAFS packet according to a format described by using a preset file system type, where the preset file system type is used to describe a format of a DMAFS packet, and the first DMAFS packet includes the operation object and an operation type that is carried in the access request message.

The sending unit 703 is configured to send the first DMAFS packet to an acceleration apparatus.

Optionally, the sending unit 703 is further configured to: before the NAS client receives the access request message, send a third DMAFS packet to the acceleration apparatus. The third DMAFS packet is used to request, from the acceleration apparatus, a directory that stores NAS data.

The receiving unit 701 is further configured to receive mount directory information sent by the acceleration apparatus, and mount the directory that stores NAS data and that is in the mount directory information onto a local directory.

Optionally, the receiving unit 701 is further configured to receive a second DMAFS packet sent by the acceleration apparatus. The second DMAFS packet carries an operation result for the first DMAFS packet, and the operation result includes the target data and the directory and/or the file to which the target data belongs.

Optionally, the processing unit 702 is further configured to update the local directory of the NAS client according to information that is about the directory and/or the file to which the target data belongs and that is in the operation result.

It should be understood that the NAS client 700 in this embodiment of the present application may correspondingly perform the method described in the embodiment of the present application. In addition, the foregoing and other operations and/or functions of the units in the NAS client 700 are respectively used to implement the corresponding procedures of the methods in FIG. 2A to FIG. 6B. For brevity, details are not described herein.

In this embodiment, an acceleration apparatus is added to a NAS client, and the acceleration apparatus completes a protocol processing process below an NFS layer in an existing protocol stack, so as to resolve a problem, caused by complex protocol processing, that the NAS client has heavy CPU load, high memory usage, and a long processing delay, and improve overall performance and data access efficiency of the NAS client.

Figure 8:
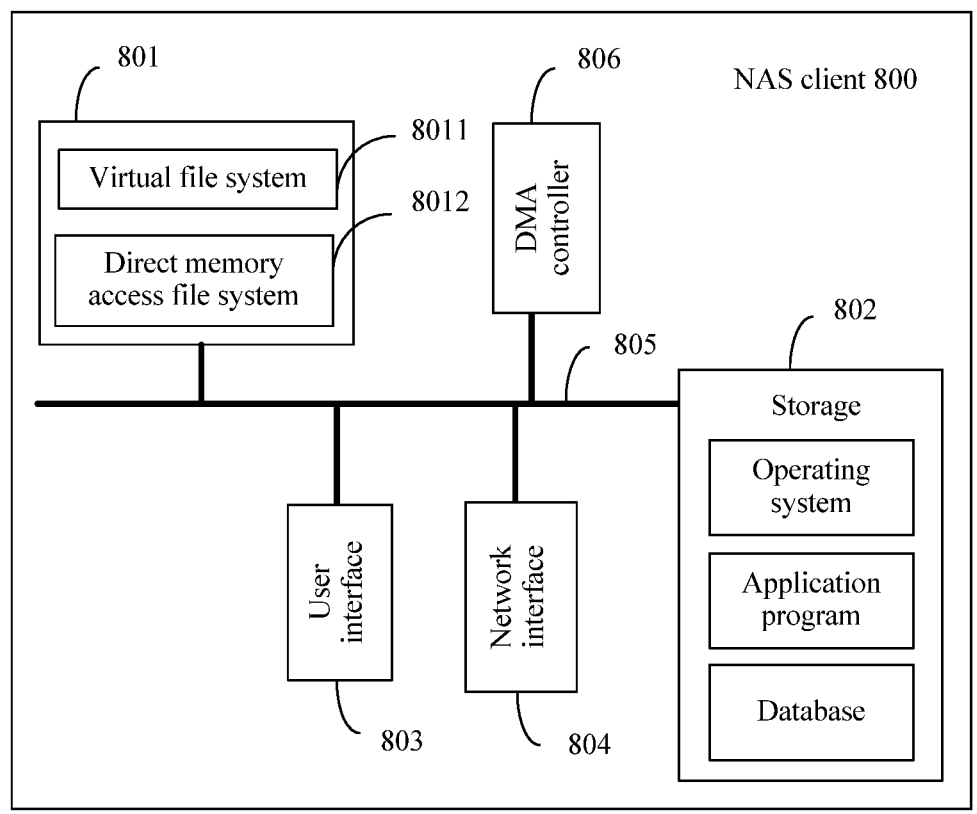
FIG. 8 is a schematic diagram of another NAS client according to the present application.

FIG. 8 is a schematic diagram of a hardware structure of a NAS client 800. As shown in the figure, the NAS client 800 includes one or more processors 801 (only one processor 801 is shown in the figure), a storage 802, and a communications bus 805. A person of ordinary skill in the art may understand that a structure shown in FIG. 8 is only an example, and the structure imposes no limitation on a structure of the NAS client 800. For example, the NAS client 800 may further include more or fewer components than those shown in FIG. 8, or may have a configuration that is different from that in FIG. 8.

The processor 801 and the storage 802 are connected by using the communications bus 805 to implement mutual communication. The storage 802 is configured to store a computer execution instruction, and when the NAS client 800 is running, the processor 801 executes the computer execution instruction in the storage to perform the following operations by using a hardware resource in the NAS client 800:

receiving an access request message, and determining an operation object according to information that is about to-be-accessed target data and that is carried in the access request message, where the operation object includes a directory and/or a file to which the target data belongs;

generating a first direct memory access file system DMAFS packet according to a format described by using a preset file system type, where the preset file system type is used to describe a format of a DMAFS packet, and the first DMAFS packet includes the operation object and an operation type that is carried in the access request message; and sending the first DMAFS packet to an acceleration apparatus, so that the acceleration apparatus converts the operation object and the operation type that are in the first DMAFS packet into network file system NFS data, and encapsulates the NFS data into a network protocol packet and sends the network protocol packet to a NAS server.

The communications bus 805 is used to implement communication between components in the NAS client 800.

By running a software program and a module (such as a virtual file system 8011 and a direct memory access file system 8012) that are stored in the storage 802, the processor 801 executes various functional applications and data processing. For example, by invoking a program instruction that is in the storage 802 and that is used to encapsulate the operation type and an operation object, the processor 801 encapsulates the operation result for the target data into a packet in a DMAFS format.

It should be understood that in this embodiment of the present application, the processor 801 may be a CPU. The processor 801 may further be another general purpose processor, a digital signal processor (DSP), an ARM processor, an application-specific integrated circuit (ASIC), a field programmable gate array (FPGA), another programmable logic device, a discrete gate or transistor logic device, a discrete hardware component, or the like. The general purpose processor may be a microprocessor or the processor may be any normal processor, or the like.

Further, the NAS client 800 provided in this embodiment of the present application further includes a DMA controller 806. The DMA controller 806 is integrated on a hardware card of the NAS client 800. An access interface of the DMA controller 806 is adapted to a direct memory access file system and a network file system that run on the processor. Under control of the processor, the DMA controller 806 can implement data transmission between the DMA controller 806 and the acceleration apparatus by using a PCIe bus, that is, the DMA controller 806 can relocate a DMAFS packet generated by the NAS client from the NAS client to the acceleration apparatus, or relocate a DMAFS packet generated by the acceleration apparatus from the acceleration apparatus to the NAS client without calculation of the processor 801, so that a processing speed of a computer system is accelerated, and data transmission efficiency is effectively improved. Optionally, a function of the DMA controller may be implemented by the processor 801 of the NAS client 800.

The storage 802 may be configured to store a software program, a module, and a database. For example, in this embodiment of the present application, the processor 801 sends a program instruction/module corresponding to the operation type and the operation object to the DMA controller 806, and relocates the DMAFS packet generated by the NAS client to the acceleration apparatus, or relocates the DMAFS packet generated by the acceleration apparatus to the NAS client. The storage 802 may include a high-speed random access memory, or may further include a non-volatile memory, for example, one or more magnetic disk storage apparatuses, a flash device, or another non-volatile solid-state storage device. In some examples, the storage 802 may further include a storage remotely disposed for the processor 801. The remote storage may be connected to the NAS client 800 by using a network. The storage 802 may include a read-only memory and a random access memory, and provide an instruction and data for the processor 801. A part of the storage 802 may further include a non-volatile random access memory. For example, the storage 802 may further store information about a device type.

Optionally, the NAS client 800 may further include a user interface 803 and a network interface 804. The user interface 803 is configured to plug-connect to an external device, or may be configured to connect to a device such as a touchscreen, a mouse, or a keyboard to receive information entered by a user. For example, the user interface 803 includes the PCIe interface or the high-speed peripheral interface shown in FIG. 2A to FIG. 2D. The network interface 804 is used by the NAS client 800 to perform mutual communication with an external device. The network interface 804 mainly includes a wired interface and a wireless interface, such as a network adapter, an RS232 module, a radio frequency module, and a WiFi module.

A person of ordinary skill in the art may understand that the structure shown in FIG. 8 is only an example, and the structure imposes no limitation on the structure of the NAS client. For example, the NAS client 800 may further include more or fewer components than those shown in FIG. 8, or may have a configuration that is different from that in FIG. 8. For example, the NAS client 800 may not include the storage 802, and the storage 802 is implemented by a device outside the NAS client.

It should be understood that the NAS client 800 in this embodiment of the present application is corresponding to the NAS client 700 provided in the embodiment of the present application. The NAS client 800 is configured to implement corresponding procedures of a NAS client in the methods shown in FIG. 2A to FIG. 6B. For brevity, details are not described herein again.

In conclusion, by means of a process in which an acceleration apparatus unloads a NAS client protocol, a prior-art problem that a NAS client has heavy CPU load, high memory usage, and a long processing delay in a NAS data access process is resolved. Further, historical data is stored by using a data cache area of the acceleration apparatus, so that an access delay in a read processing process can be reduced, and read processing efficiency of NAS data access is improved. In common methods, in the streaming media industry, a small cache capacity associated with a network file system caused by a limited cache area of the NAS client causes problems of a low hit ratio and a long data access delay. In comparison, a cache associated with the network file system is relocated to the acceleration apparatus by using the acceleration apparatus, and an access request delivered from a VFS is not cached in the NAS client. In this way, the prior-art problems of a low hit ratio and a long data access delay caused by the small cache capacity associated with the network file system are resolved, so that processing efficiency of NAS data access is improved.

Figure 9:
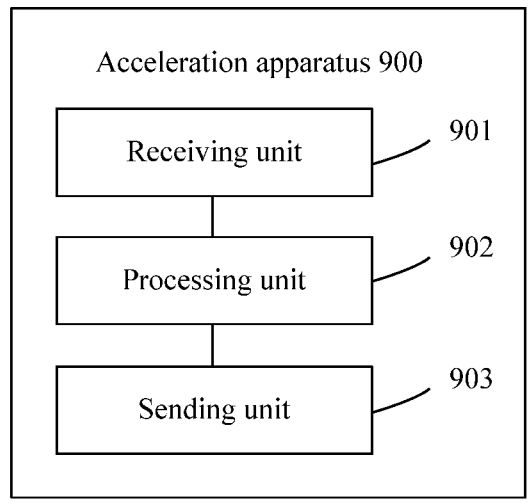
FIG. 9 is a schematic diagram of an acceleration apparatus according to the present application.

FIG. 9 is a schematic diagram of an acceleration apparatus 900 according to the present application. As shown in the figure, the acceleration apparatus 900 includes a receiving unit 901, a processing unit 902, and a sending unit 903.

The receiving unit 901 is configured to receive a first DMAFS packet sent by a NAS client, where the first DMAFS packet carries an operation object and an operation type.

The processing unit 902 is configured to: obtain the operation object and the operation type that are in the first DMAFS packet, convert the operation object and the operation type into network file system NFS data, and encapsulate the NFS data into a network protocol packet.

The sending unit 903 is configured to send the network protocol packet to a NAS server.

A network protocol includes any one of the following protocols: TCP/IP, UDP/IP, and RDMA.

A protocol processing process of a NAS client is unloaded by using the foregoing acceleration apparatus 900, so that CPU and memory load of the NAS client is reduced. In addition, data transmission is performed between the acceleration apparatus 900 and the NAS client by using a DMA packet, so that a processing delay is reduced, and efficiency of an overall NAS data access process is improved.

Optionally, the processing unit 902 is further configured to: when the network protocol is TCP/IP, encapsulate the NFS data into a first external data representation XDR packet, encapsulate the first XDR packet into a first remote procedure call RPC packet, and encapsulate the first RPC packet into a first TCP/IP packet.

Optionally, the processing unit 902 is further configured to: when the network protocol is UDP/IP, encapsulate the NFS data into a first external data representation XDR packet, encapsulate the first XDR packet into a first remote procedure call RPC packet, and encapsulate the first RPC packet into a first UDP/IP packet.

Optionally, the processing unit 902 is further configured to: when the network protocol is RDMA, encapsulate the NFS data into a first external data representation XDR packet, encapsulate the first XDR packet into a first remote procedure call RPC packet, and encapsulate the first RPC packet into a first RDMA packet.

Optionally, the sending unit 903 is further configured to: before the receiving unit 901 receives the access request message, send a first request message to the NAS server. The first request message is used to request, from the NAS server, a directory that stores NAS data.

The receiving unit 901 is further configured to receive mount directory information sent by the NAS server, where the mount directory information includes information about the directory that stores NAS data and that is in the NAS server.

The processing unit 902 is further configured to mount, according to the mount directory information, the directory that stores NAS data and that is in the NAS server onto a local directory.

Optionally, the receiving unit 901 is further configured to receive a third DMAFS packet, where the third DMAFS packet is used by the NAS client to request, from the acceleration apparatus, the directory that stores NAS data.

The sending unit 903 is further configured to send the mount directory information to the NAS client.

Optionally, the processing unit 902 is further configured to: when target data exists in a data cache area, perform an operation on the target data according to the operation object and the operation type.

The sending unit 903 is further configured to send an operation result for the target data to the NAS client.

Optionally, the processing unit 902 is further configured to: when the operation type is a read request, obtain the target data in the data cache area and a directory and/or a file to which the target data belongs.

The sending unit 903 is further configured to send the directory and/or the file to which the target data belongs and the target data to the NAS client.

Optionally, the processing unit 902 is further configured to: when the operation type is a write request, obtain the target data, and perform an operation of the write request on the target data.

The sending unit 903 is further configured to send the operation object and the operation type to the NAS server, and send response information of a write operation to the NAS client.

The receiving unit 901 is further configured to receive response information that is from the NAS server and that is of the write operation performed on the target data, where the response information of the write operation is used to indicate whether the write operation is successfully performed on the target data.

Optionally, the sending unit 903 is further configured to: when the target data does not exist in the data cache area, send the operation object and the operation type to the NAS server.

The receiving unit 901 is configured to receive an operation result that is for the target data and that is sent by the NAS server.

Optionally, the sending unit 903 is further configured to: when the operation type is a read request, send the operation object and the operation type to the NAS server.

The receiving unit 901 is further configured to receive an operation result that is of the read request for the target data and that is sent by the NAS server, where the operation result of the read request includes the target data and a directory and/or a file to which the target data belongs.

The processing unit 902 is further configured to store the operation result in the data cache area.

The sending unit 903 is further configured to send the operation result to the NAS client.

Optionally, the sending unit 903 is further configured to: when the operation type is a write request, send the operation object and the operation type to the NAS server, and send response information of a write operation to the NAS client.

The receiving unit 901 is configured to receive response information that is sent by the NAS server and that is of an operation of the write request performed on the target data.

Optionally, the receiving unit 901 is further configured to receive a network protocol packet that carries an operation result for the target data and that is sent by the NAS server, where the operation result includes the target data and a directory and/or a file to which the target data belongs.

The processing unit 902 is further configured to generate a second DMAFS packet according to a preset file system type, where the second DMAFS packet includes the operation result.

The sending unit 903 is further configured to send the second DMAFS packet to the NAS client.

Optionally, the processing unit 902 is further configured to update the local directory of the acceleration apparatus according to information that is about the directory and/or the file to which the target data belongs and that is in the operation result.

According to the description of the foregoing acceleration apparatus 900, historical data is stored by using a data cache area of the acceleration apparatus, so that an access delay in a read processing process can be reduced, and read processing efficiency of NAS data access is improved. In addition, in common methods, in the media assets industry, a small cache capacity associated with a network file system caused by a limited cache area of a NAS client causes problems of a low hit ratio and a long data access delay. In comparison, a cache associated with the network file system is relocated to the acceleration apparatus by using the acceleration apparatus, and an access request delivered from a VFS is not cached in the NAS client. In this way, a NAS data processing delay is reduced to some extent.

Figure 10:
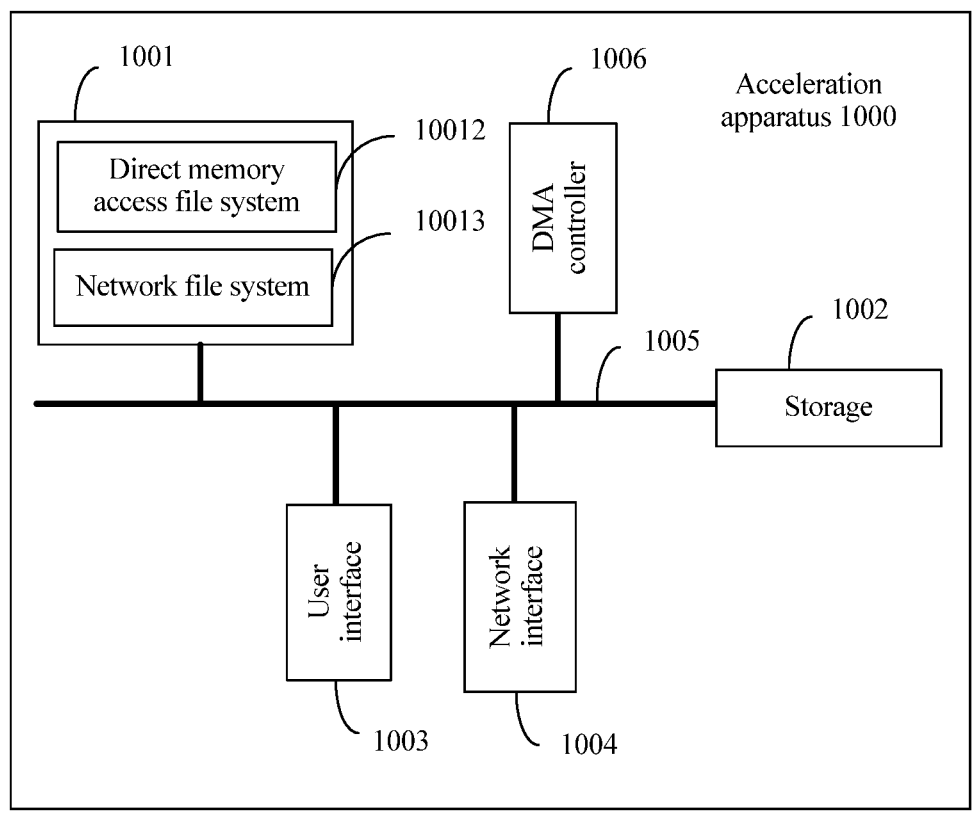
FIG. 10 is a schematic diagram of another acceleration apparatus according to the present application.

FIG. 10 is a schematic diagram of an acceleration apparatus 1000 according to an embodiment of the present application. As shown in the figure, the acceleration apparatus 1000 includes a processor 1001, a storage 1002, a user interface 1003, a network interface 1004, and a communications bus 1005. The acceleration apparatus 1000 is connected to a NAS client by using the user interface 1003 and is connected to a NAS server by using the network interface 1004. The processor 1001, the storage 1002, the user interface 1003, and the network interface 1004 communicate by using the communications bus 1005, or may implement communication by using another means such as wireless transmission. The storage 1002 is configured to store an instruction, and the processor 1001 is configured to execute the instruction stored by the storage 1002. The storage 1002 stores program code, and the processor 1001 may invoke the program code stored in the storage 1002 to perform the following operations:

receiving a first direct memory access file system DMAFS packet sent by the NAS client, where the first DMAFS packet carries an operation object and the operation type;

obtaining the operation object and the operation type that are in the first DMAFS packet;

converting the operation object and the operation type into network file system NFS data, and encapsulating the NFS data into a network protocol packet; and sending the network protocol packet to the NAS server.

A network protocol includes any one of the following protocols: the Transmission Control Protocol/Internet Protocol TCP/IP, the User Datagram Protocol/Internet Protocol UDP/IP, and Remote Direct Memory Access RDMA.

A person of ordinary skill in the art may understand that a structure shown in FIG. 10 is only an example, and the structure imposes no limitation on a structure of the acceleration apparatus. For example, the acceleration apparatus 1000 may further include more or fewer components than those shown in FIG. 10, or may have a configuration that is different from that in FIG. 10.

The communications bus 1005 is configured to implement communication between components in the acceleration apparatus. In addition to a data bus, the communications bus 1005 may further include a power bus, a control bus, a status signal bus, and the like. However, for clarity of description, various buses are marked as the communications bus 1005 in the figure.

The user interface 1003 is configured to plug-connect to an external device. For example, the user interface 1003 includes the PCIe interface or the high-speed peripheral interface shown in FIG. 2A to FIG. 2D. The network interface 1004 is used by the NAS client to perform mutual communication with an external device. The network interface 1004 mainly includes a wired interface and a wireless interface, such as a network adapter, an RS232 module, a radio frequency module, and a WiFi module.

By running a software program and a module (such as a direct memory access file system 10012 and a network file system 10013) that are stored in the storage 1002, the processor 1001 executes various functional applications and data processing. For example, by invoking a program instruction that is in the storage 1002 and that is used to encapsulate an operation result for target data, the processor 1001 encapsulates the operation result for the target data into a packet in a direct memory access DMA remote data format.

It should be understood that in this embodiment of the present application, the processor 1001 may be a CPU. The processor 1001 may further be another general purpose processor, a digital signal processor (DSP), an ARM processor, an application-specific integrated circuit (ASIC), a field programmable gate array (FPGA), another programmable logic device, a discrete gate or transistor logic device, a discrete hardware component, or the like. The general purpose processor may be a microprocessor or this processor may be any normal processor, or the like.

Further, the acceleration apparatus 1000 provided in this embodiment of the present application further includes a DMA controller 1006. The DMA controller 1006 is integrated on a hardware card of the acceleration apparatus. An access interface of the DMA controller 1006 is adapted to a direct memory access file system and a network file system that run on the processor. Under control of the processor, the DMA controller 1006 can implement data transmission between the DMA controller 1006 and the acceleration apparatus by using a PCIe bus, that is, the DMA controller can relocate a DMAFS packet of the NAS client to the acceleration apparatus, or relocate a DMAFS packet generated by the acceleration apparatus to the NAS client without calculation of the processor 1001, so that a processing speed of a computer system is accelerated, and data transmission efficiency is effectively improved. Optionally, the DMA controller 1006 may be implemented by the processor 1001.

The storage 1002 may be configured to store a software program and a module. For example, in this embodiment of the present application, the processor 1001 sends a program instruction/module corresponding to the operation result for the target data to the DMA controller 1006, and stores historical data of a processed NAS access request. The storage 1002 may include a high-speed random access memory, or may further include a non-volatile memory, for example, one or more magnetic disk storage apparatuses, a flash device, or another non-volatile solid-state storage device. In some examples, the storage 1002 may further include a storage remotely disposed for the processor 1001. The remote storage may be connected to the acceleration apparatus by using a network. The storage 1002 may include a read-only memory and a random access memory, and provide an instruction and data for the processor 1001. A part of the storage 1002 may further include a non-volatile random access memory.

It should be understood that the acceleration apparatus 1000 in this embodiment of the present application is corresponding to the acceleration apparatus 900 provided in the embodiment of the present application. The acceleration apparatus 1000 is configured to implement the methods shown in FIG. 2A to FIG. 6B performed by a corresponding execution body in the embodiments of the present application. For brevity, details are not described herein again.

In a possible embodiment, the present application provides a NAS data access system. The system includes the NAS client and the acceleration apparatus provided in the foregoing embodiments. The acceleration apparatus includes a first interface and a second interface, and the acceleration apparatus is connected to the NAS client by using the first interface and is connected to a NAS server by using the second interface. The NAS client receives an access request message, and determines an operation object according to information that is about to-be-accessed target data and that is carried in the access request message, where the operation object includes a directory and/or a file to which the target data belongs. Then, the NAS client generates a first DMAFS packet according to a preset file system type. The preset file system type is used to describe a format of a DMAFS packet, and the first DMAFS packet includes the operation object and an operation type that is carried in the access request message. Then, the NAS client sends the first DMAFS packet to the acceleration apparatus. Further, the acceleration apparatus obtains the operation type and the operation object that are in the first DMAFS packet, continues to complete a processing process from an NFS to a network protocol packet, and then sends a network protocol packet that carries the operation type and the operation object to the NAS server. In this way, a prior-art problem that CPU and memory load is extremely heavy in a process in which the NAS client performs NAS protocol processing is resolved. In conclusion, in this embodiment of the present application, a protocol processing process of the NAS client is unloaded by using the acceleration apparatus, so that a processing delay of the NAS client is reduced. In addition, CPU and memory load of the NAS client caused by a complex protocol processing process is reduced, so that processing efficiency of the overall NAS data access system is improved, and a processing delay is reduced. Further, a pre-defined file system is compatible with a NAS protocol stack processing process, and can be properly applied to the protocol, so that CPU and memory load and a processing delay of the NAS client are effectively reduced.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A network attached storage (NAS) data access method, wherein the method is applied to a NAS system, the NAS system comprises a NAS client and an acceleration apparatus, the acceleration apparatus comprises a first interface and a second interface, the acceleration apparatus is communicatively coupled to the NAS client by using the first interface and is communicatively coupled to a NAS server by using the second interface, and the method comprises:

receiving, by the acceleration apparatus, a first packet sent by the NAS client, wherein the first packet carries an operation object and an operation type of to-be-accessed target data, wherein the first packet is generated by the NAS client according to a first file system type which is adapted to a virtual file system and the first packet is a format of a direct memory access file system (DMAFS) packet;

obtaining, by the acceleration apparatus, the operation object and the operation type that are in the first packet;

converting, by the acceleration apparatus, the operation object and the operation type in the first packet using a network file system layer data conversion process to convert the operation object to a second operation object having a name of the to-be-accessed target data in a network file system of the NAS server and determine a second operation type supported by the NAS server that corresponds to the operation type, and encapsulating the second operation object and the second operation type into a second packet, wherein the second packet is a network protocol formatted packet compatible with a network protocol of the NAS server and comprises the second operation object, the second operation type, and additional data used by the network protocol when reverse processing an encapsulated packet; and sending, by the acceleration apparatus, the second packet to the NAS server.

2. The method according to claim 1, wherein the first interface is a peripheral component interconnect express (PCIe) interface or a high-speed peripheral interface, and the second interface is a network adapter interface.

3. The method according to claim 1, wherein the acceleration apparatus further comprises a data cache area, and the method further comprises:

when the target data exists in the data cache area and the operation type is a read request, obtaining the target data in the data cache area and a directory and/or a file to which the target data belongs, and sending the directory and/or the file to which the target data belongs and the target data to the NAS client.

4. The method according to claim 3, wherein:

when the target data exists in the data cache area and the operation type is a write request, obtaining the target data, and performing an operation of the write request on the target data;

sending the operation object and the operation type to the NAS server;

receiving response information that is from the NAS server and that is of the operation of the write request performed on the target data; and sending the response information of the operation of the write request to the NAS client.

5. The method according to claim 1, wherein the NAS client performs a first subset of operations of a NAS protocol stack to generate the first packet and forwards the first packet to the acceleration apparatus using a virtual file system layer, and the acceleration apparatus performs a second subset of operations to complete a remainder operations of the NAS protocol stack to generate the second packet after obtaining the operation type and the operation object that are sent by the NAS client, and wherein the acceleration apparatus performs the sending after completion of the remainder of operations of the NAS protocol stack.

6. A network attached storage (NAS) data access method, wherein the method is applied to a NAS system, the NAS system comprises a NAS client and an acceleration apparatus, the acceleration apparatus comprises a first interface and a second interface, the acceleration apparatus is communicatively coupled to the NAS client by using the first interface and is communicatively coupled to a NAS server by using the second interface, and the method comprises:

receiving, by the NAS client, an access request message, and determining an operation object according to information that is about to-be-accessed target data and that is carried in the access request message, wherein the operation object comprises a directory and/or a file to which the target data belongs;

generating, by the NAS client, a first packet according to a first file system type, wherein the first file system type indicates a format of a DMAFS packet, and the first packet comprises the operation object and an operation type that is carried in the access request message; and sending, by the NAS client, the first packet to the acceleration apparatus, so that the acceleration apparatus converts the operation object and the operation type in the first packet using a network file system layer data conversion process to convert the operation object to a second operation object having a name of the to-be-accessed target data in a network file system of the NAS server and determine a second operation type supported by the NAS server that corresponds to the operation type, and encapsulates the second operation object and the second operation type into a second packet, and sends the second packet to the NAS server, wherein the second packet is a network protocol formatted packet compatible with a network protocol of the NAS server and comprises the second operation object, the second operation type, and additional data used by the network protocol when reverse processing an encapsulated packet.

7. The method according to claim 6, wherein the first interface is a peripheral component interconnect express (PCIe) interface or a high-speed peripheral interface, and the second interface is a network adapter interface.

8. An acceleration apparatus for network attached storage (NAS) data access, wherein the acceleration apparatus comprises a processor, a storage, a user interface, a network interface, and a communications bus; the acceleration apparatus is communicatively coupled to a NAS client by using the user interface and is communicatively coupled to a NAS server by using the network interface; the processor, the storage, the user interface, and the network interface are communicatively coupled by using the communications bus to implement mutual communication; the storage is configured to store a computer execution instruction, and when the acceleration apparatus is running, the processor executes the computer execution instruction in the storage to:

receive a first packet sent by the NAS client, wherein the first packet carries an operation object and an operation type of to-be-accessed target data, wherein the first packet is generated by the NAS client according to a first file system type which is adapted to a virtual file system and the first packet is a format of a direct memory access file system (DMAFS);

obtain the operation object and the operation type that are in the first packet;

convert the operation object and the operation type in the first packet using a network file system layer data conversion process to convert the operation object to a second operation object having a name of the to-be-accessed target data in a network file system and determine a second operation type supported by the NAS server that corresponds to the operation type, and encapsulate the second operation object and the second operation type into a second packet, wherein the second packet is a network protocol formatted packet compatible with a network protocol of the NAS server and comprises the second operation object, the second operation type, and additional data used by the network protocol when reverse processing an encapsulated packet; and send the second packet to the NAS server.

9. The acceleration apparatus according to claim 8, wherein the user interface is a peripheral component interconnect express (PCIe) interface or a high-speed peripheral interface, and the network interface is a network adapter interface.

10. The acceleration apparatus according to claim 8, wherein the acceleration apparatus further comprises a data cache area, where the processor is configured to:

when the target data exists in the data cache area and the operation type is a read request, obtain the target data in the data cache area and a directory and/or a file to which the target data belongs, and send the directory and/or the file to which the target data belongs and the target data to the NAS client.

11. The acceleration apparatus according to claim 10, where the processor is configured to:
- when the target data exists in the data cache area and the operation type is a write request, obtain the target data, and perform an operation of the write request on the target data;
- send the operation object and the operation type to the NAS server;
- receive response information that is from the NAS server and that is of the operation of the write request performed on the target data; and
- send the response information of the operation of the write request to the NAS client.

12. A non-transitory computer-readable storage medium comprising instructions which, when executed by a computer, cause the computer to perform a method, comprising:
- receiving a first packet sent by a network attached storage (NAS) client, wherein the first packet carries an operation object and an operation type of to-be-accessed target data, wherein the first packet is generated by the NAS client according to a first file system type which is adapted to a virtual file system and the first packet is a format of a direct memory access file system (DMAFS) packet;
- obtaining the operation object and the operation type that are in the first packet;
- converting the operation object and the operation type in the first packet using a network file system layer data conversion process to convert the operation object to a second operation object having a name of the to-be-accessed target data in a network file system of a NAS server and determine a second operation type supported by the NAS server that corresponds to the operation type, and encapsulating the second operation object and the second operation type into a second packet; wherein the second packet is a network protocol formatted packet compatible with a network protocol of the NAS server and comprises the second operation object, the second operation type, and additional data used by the network protocol when reverse processing an encapsulated packet; and
- sending the second packet to the NAS server.

13. A network attached storage (NAS) data access system, wherein the system comprises:
- a NAS client and an acceleration apparatus, the acceleration apparatus comprises a first interface and a second interface, and the acceleration apparatus is communicatively coupled to the NAS client by using the first interface and is communicatively coupled to a NAS server by using the second interface;
- the NAS client is configured to: receive an access request message, and determine an operation object according to information that is about to-be-accessed target data and that is carried in the access request message, wherein the operation object comprises a directory and/or a file to which the target data belongs; generate a first packet according to a first file system type which is adapted to a virtual file system, wherein the first file system type indicates a format of a direct memory access file system (DMAFS), and the first packet comprises the operation object and an operation type that is carried in the access request message; and send the first packet to the acceleration apparatus; and
- the acceleration apparatus is configured to: receive the first packet, and obtain the operation object and the operation type that are in the first packet;
- convert the operation object and the operation type in the first packet using a network file system layer data conversion process to convert the operation object to a second operation object having a name of the to-be-accessed target data in a network file system of the NAS server and determine a second operation type supported by the NAS server that corresponds to the operation type; and encapsulate the second operation object and the second operation type into a second packet, wherein the second packet is a network protocol formatted packet compatible with a network protocol of the NAS server and comprises the second operation object, the second operation type, and additional data used by the network protocol when reverse processing an encapsulated packet; and send the second packet to the NAS server.

14. The system according to claim 13, wherein the first interface is a peripheral component interconnect express (PCIe) interface or a high-speed peripheral interface, and the second interface is a network adapter interface.

15. The system according to claim 14, wherein the acceleration apparatus further comprises a data cache area; and
- the acceleration apparatus is further configured to: when the target data exists in the data cache area and the operation type is a read request, obtain the target data in the data cache area and a directory and/or a file to which the target data belongs, and send the directory and/or the file to which the target data belongs and the target data to the NAS client.

16. The system according to claim 15, wherein:
- the acceleration apparatus is further configured to: when the target data exists in the data cache area and the operation type is a write request, obtain the target data, and perform an operation of the write request on the target data; send the operation object and the operation type to the NAS server; and receive response information that is from the NAS server and that is of the operation of the write request performed on the target data; and send the response information of the operation of the write request to the NAS client.

* * * * *